(12) United States Patent
Farawila

(10) Patent No.: US 8,553,829 B2
(45) Date of Patent: Oct. 8, 2013

(54) REDUCED ORDER STRESS MODEL FOR ONLINE MANEUVERING, DIAGNOSTICS OF FUEL FAILURE AND DESIGN OF CORE LOADING PATTERNS OF LIGHT WATER REACTORS

(75) Inventor: Yousef Farawila, Richland, WA (US)

(73) Assignee: Areva NP SAS, Lyon Cedex (FR)

( * ) Notice: Subject to any disclaimer, the term of this patent is extended or adjusted under 35 U.S.C. 154(b) by 843 days.

(21) Appl. No.: 11/862,145

(22) Filed: Sep. 26, 2007

(65) Prior Publication Data

US 2009/0080585 A1  Mar. 26, 2009

(51) Int. Cl.
*G21C 7/36* (2006.01)
(52) U.S. Cl.
USPC ............ 376/217; 376/207; 376/215; 376/216
(58) Field of Classification Search
None
See application file for complete search history.

(56) References Cited

U.S. PATENT DOCUMENTS

| | | | | |
|---|---|---|---|---|
| 3,140,398 | A | * | 7/1964 | Reinhardt et al. ............ 250/392 |
| 3,679,596 | A | * | 7/1972 | Hill et al. ..................... 252/638 |
| 4,581,196 | A | * | 4/1986 | Sakagami et al. ............ 376/216 |
| 6,400,786 | B1 | | 6/2002 | Mourlevat et al. |
| 6,430,247 | B1 | | 8/2002 | Mourlevat et al. |
| 6,535,568 | B1 | | 3/2003 | Reese |
| 2006/0165210 | A1 | | 7/2006 | Karve et al. |
| 2008/0205576 | A1 | * | 8/2008 | Takeda et al. ................. 376/262 |

OTHER PUBLICATIONS

M. R. Billaux, "Modeling Pellet-Cladding Mechanical Interaction and Application to BWR Maneuvering," Proceedings of the International Meeting on LWR Fuel Performance, Paper 1047, Orlando, Florida, Sep. 19-22, 2004.
Billaux-Modeling Pellet-Cladding..., only p. 1047 is available at the time of preparing this IDS with the full article to be obtained but with emphasis on p. 1047.
Billaux, Sierra: A Code to Predict . . . , pp. 1 to 9.

* cited by examiner

*Primary Examiner* — Jack W Keith
*Assistant Examiner* — Marshall O'Connor
(74) *Attorney, Agent, or Firm* — Floyd E. Ivey

(57) ABSTRACT

The invention is principally directed to a reduced order model, XEDOR, facilitating the prediction of and the diagnostics of pellet-clad interaction stress-corrosion-cracking failure of nuclear fuel rods. The invention more particularly relates to assessment of susceptibility to PCI failure for guidance in the design of fuel loading in nuclear reactors. The invention additionally relates to the protection against PCI failure by providing operational information to operators of a nuclear reactor during power maneuvering, including predictive calculations prior to executing power maneuvers. Additionally, the invention relates to the diagnostics of an event suggesting a possible PCI cladding failure.

21 Claims, 9 Drawing Sheets

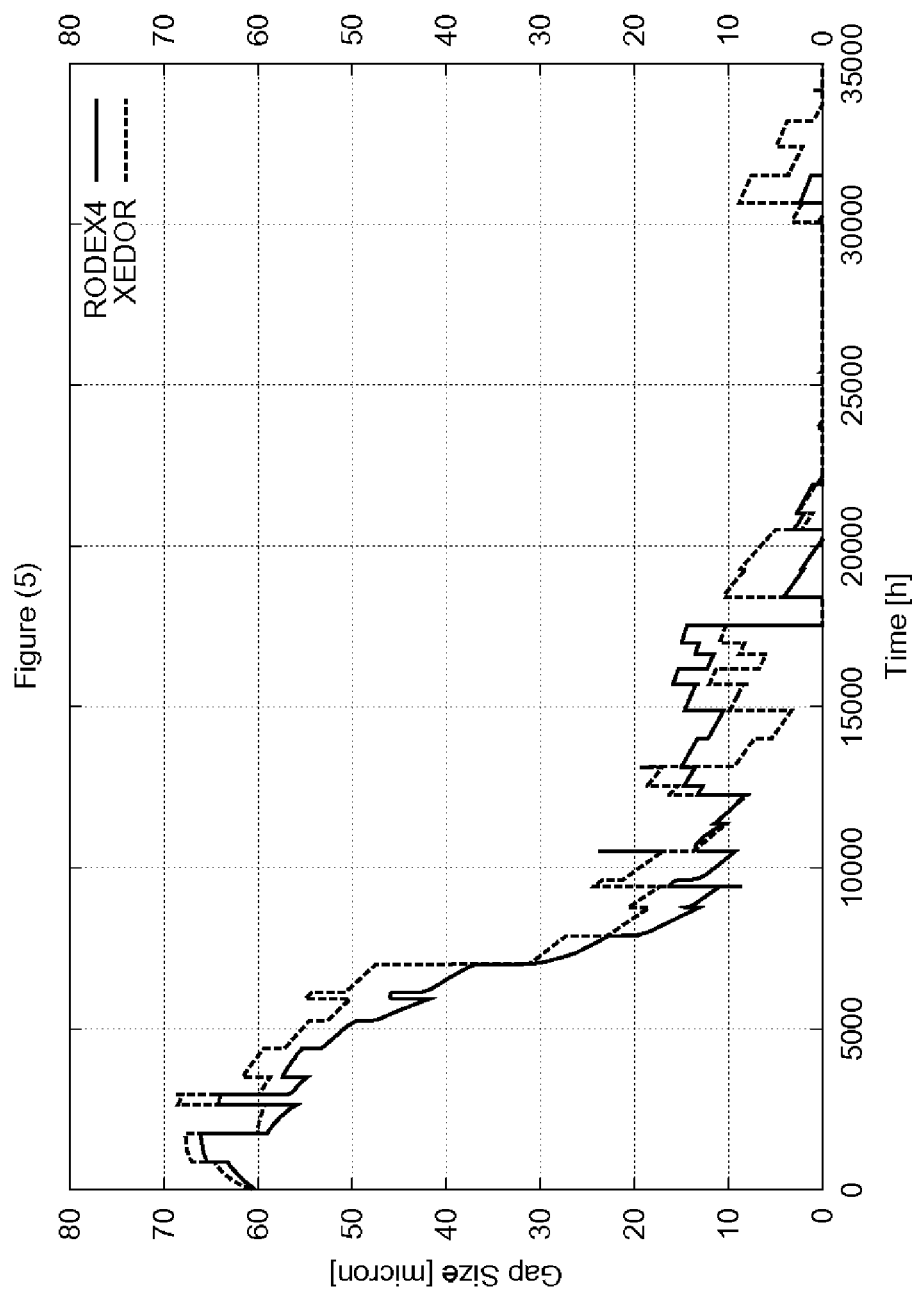
Figure (5)

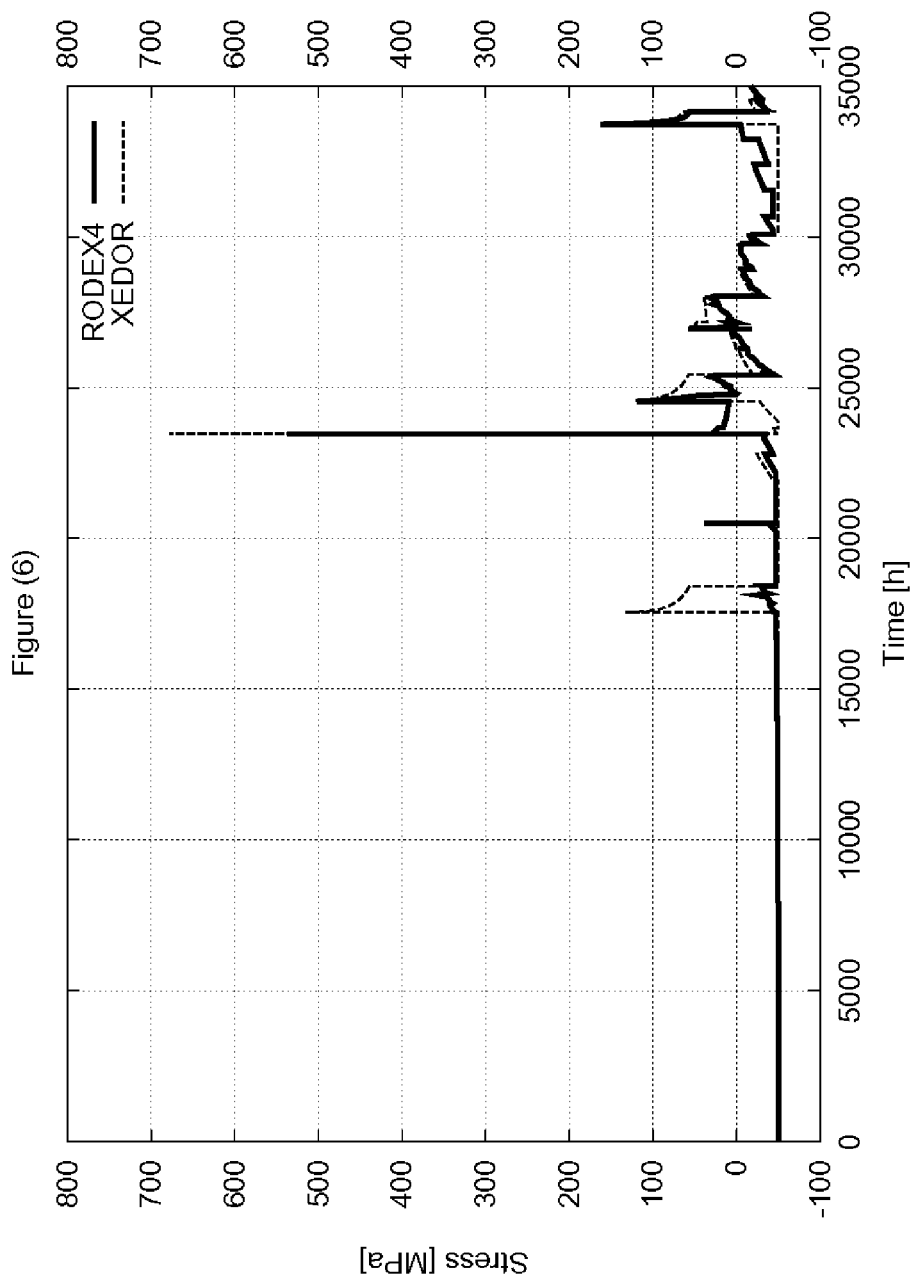
Figure (6)

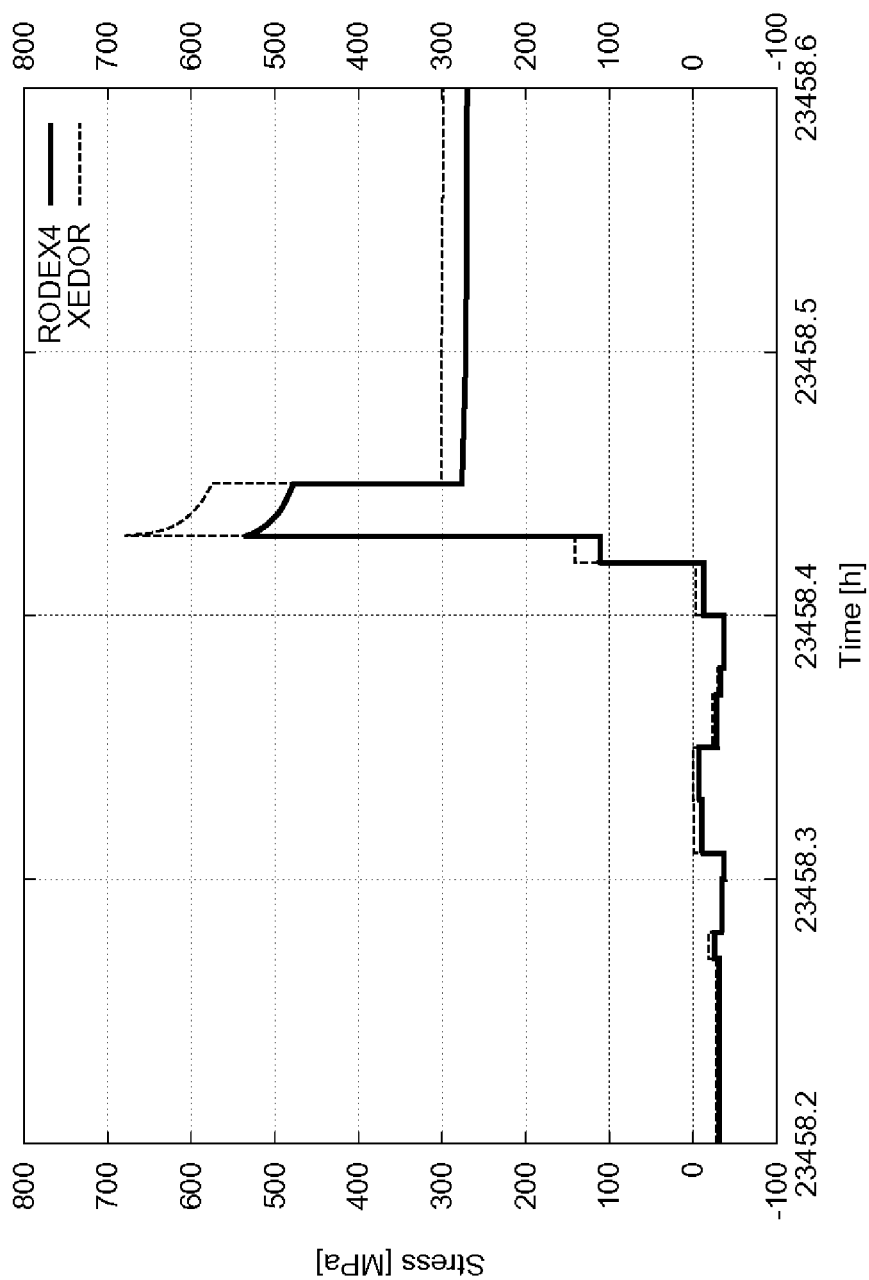
Figure (7)

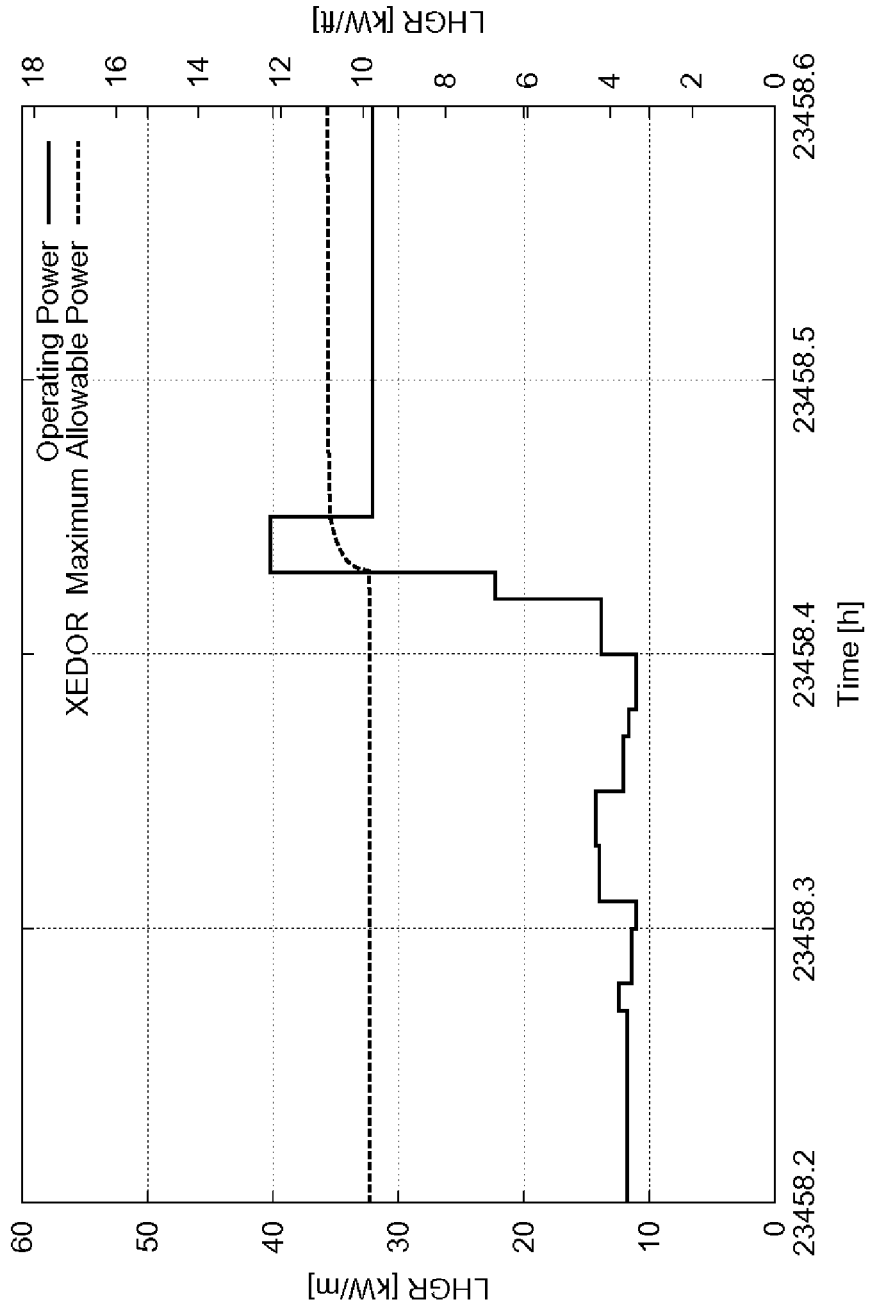
Figure (8)

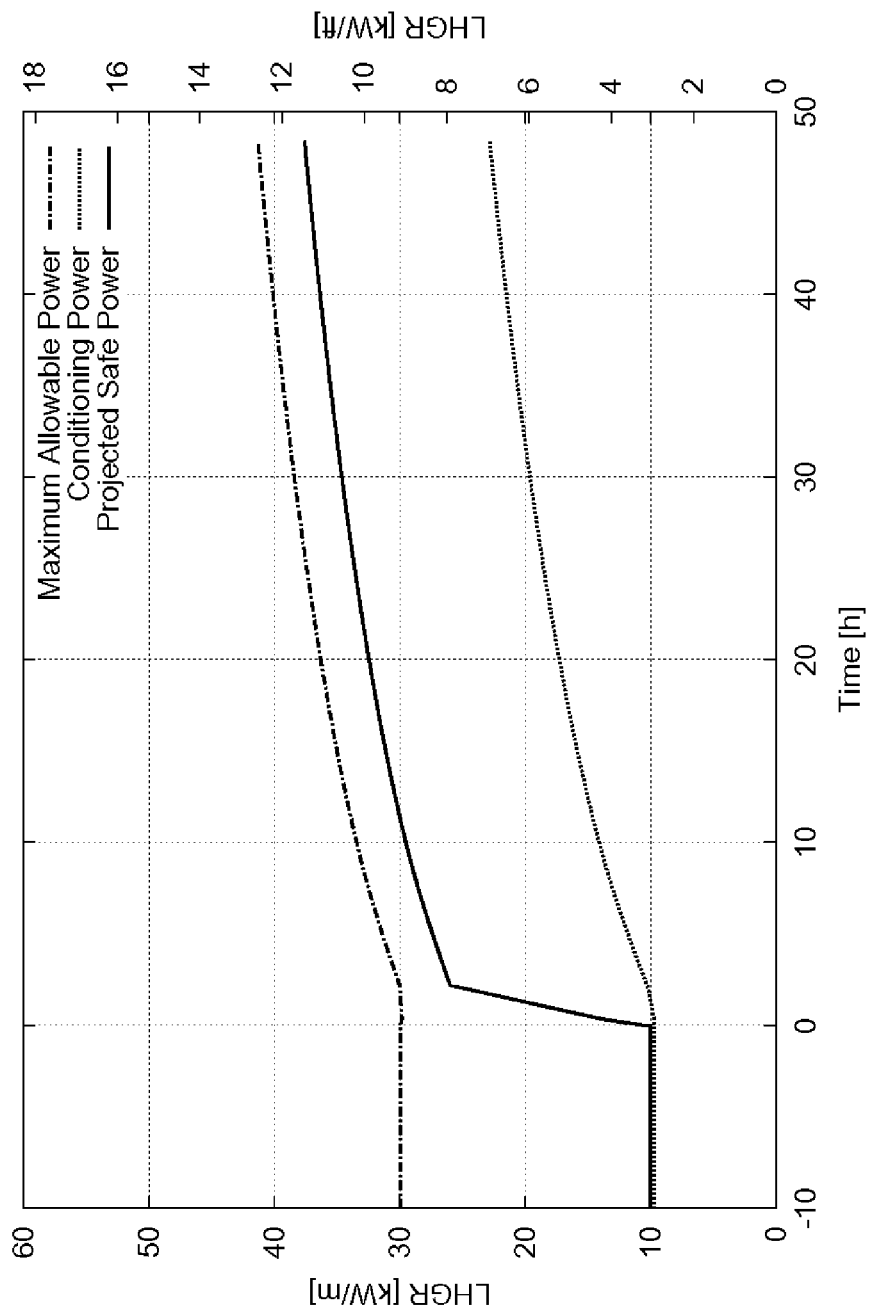
Figure (9)

REDUCED ORDER STRESS MODEL FOR ONLINE MANEUVERING, DIAGNOSTICS OF FUEL FAILURE AND DESIGN OF CORE LOADING PATTERNS OF LIGHT WATER REACTORS

FIELD OF THE INVENTION

The field of the invention relates to the prediction of, the protection against and the diagnostics of pellet-clad interaction stress-corrosion-cracking failure of nuclear fuel rods. The field more particularly relates to assessment of susceptibility to PCI failure for guidance in the design of nuclear reactors. The field additionally relates to the protection against PCI failure by providing operational information to operators of a nuclear reactor during power maneuvering. Additionally, the field relates to the diagnostics of an event suggesting a possible PCI failure.

BACKGROUND OF THE INVENTION

Pellet-Clad Interaction—Fuel Rod Failure

Strong pellet-clad interaction resulting in high stress in the cladding is one of the lead causes of preventable fuel failure in light water reactors. This type of reactor is fueled with multiple assemblies where the basic element of each assembly is a single fuel rod. A fuel rod is made of a long cylindrical tube of a zirconium alloy inside which a stack of uranium oxide pellets occupies the majority of the volume. Each of the fuel pellets is generally cylindrical in shape. Geometrical variations of the pellet structure include dishing the flat ends of the pellet, chamfering of the pellet edges, introducing a vertical hole in the pellet center, and varying the pellet height-to-diameter ratio. Material variations of the fuel pellets include the ceramic density relative to its maximum possible theoretical value, i.e. variation in the pellet material porosity. Pellet material variation includes the isotopic composition of the fissionable elements, i.e. uranium enrichment in the fissile isotope U-235 and the possibility of including plutonium oxide in the ceramic matrix. Another common variation of the pellet material is the addition of a neutron absorber for reactivity control, such as gadolinium or boron. Additives to the fuel pellets may include trace elements for modifying its microstructure such a chromium oxide doping.

The fuel tube, henceforth called clad or cladding, may also vary in its dimensions and material composition. The base material is zirconium alloyed with varying percentages of other elements, most common alloys being the well known Zircaloy 2 and Zircaloy 4. The clad structure is generally a thin-walled tube, where the diameter and the wall thickness-to-diameter ratio vary from design to design. In some fuel designs, the inner surface of the cladding tube is made of a so-called liner or barrier which is a thin layer of soft zirconium or a different zirconium-based alloy.

The cladding tube, sealed at one end, is loaded with fuel pellets and then pressurized with helium gas before it is sealed at the other end. While the stack of fuel pellets occupies the majority of the fuel rod volume, there is a free volume reserved for the collection of fission gasses mainly in the upper part, the so-called upper plenum, and optionally at the lower end. The upper plenum contains a spring to press the pellet stack down and maintain the fuel stack continuity. The inner diameter of the cladding is slightly larger than the outer diameter of the fuel pellets, leaving a space of the approximate size of 100 microns, henceforth called the gap or pellet-clad gap, which also varies depending on fuel design and manufacturing process.

Operational Effects on Fuel Rod

During reactor operation, the fuel rods are subjected to extreme conditions which must be understood to protect the integrity of the fuel rods. External to the fuel rods, the coolant is pressurized to approximately 7 MPa in the case of boiling water reactors (BWR) and 14 MPa in the case of pressurized water reactors (PWR). Under neutron irradiation, the nuclei of the heavy fissionable isotopes split into medium weight nuclei and emit additional neutrons to sustain the fission chain reaction while releasing energy. The heat generated in fuel rods per unit length is so high that steep temperature gradients between the center and surface of the fuel pellets develop which results in large internal stress gradients due to thermal expansion of the pellet material, with the effect that the ceramic pellet material is deformed and is often cracked. The multiple effects on the fuel pellets include volume swelling due to the fact that there are two fission product nuclei for each heavy isotope that undergoes fission. There is also the opposite effect of pellet volume reduction due to the collapse of the pores. The net volume change is initially negative, but a net volume increase occurs as the exposure to neutron flux continues and the so-called burnup increases. Some of the fission products are gaseous, such as Xe, and a fraction of these gases escape outside the pellet material microstructure into the free volume inside the fuel rod causing its pressure to increase. There are numerous chemical compounds that form from the fission products, and some of these have corrosive effects on the cladding material. Notable among the corrosive chemical agents is iodine, which forms a series of zirconium iodides, and the most corrosive of these iodides is $ZrI4$.

The irradiation effects on the clad include the microstructure defects that occur when the fast neutrons (energy >1 MeV) collide with the zirconium nuclei. The effect of the cumulative fast neutron flux, the so-called fluence, reduces the ductility of the cladding material, and also promotes the permanent deformation, the so-called irradiation-induced creep, when the material is subjected to mechanical stresses. Clad elongation under fast neutron irradiation also occurs without the influence of external stress, and so-called temperature-induced creep occurs under external stress without the presence of fast neutron irradiation. However, the processes involved are so complicated such that temperature-induced creep rate is also affected by the fast neutron fluence.

The mechanical stresses on the clad include the compressive component due to the external coolant pressure, which cause the so-called clad creep-down, which is accelerated under the influence of fast neutron irradiation, with the general effect of reducing the pellet-clad gap. A tensile stress component in the clad occurs when the gap vanishes as the pellet and clad come into direct contact, a condition called pellet-clad-mechanical interaction (PCMI) or pellet-clad interaction (PCI). The tensile stress that occurs due to PCMI is in the tangential direction, also called hoop stress. The magnitude of the tensile stress increases with the processes that cause the pellet volume to increase and decreases (stress relief) as the cladding material creeps out in response to the imposed stress. It should be noted that the zirconium alloys used for cladding material are highly anisotropic where the degree of anisotropy is dependent on the heat treatment of the cladding, i.e. being fully or partially re-crystallized under relatively high temperature as part of the manufacturing process. Large tensile stresses may result when a gap is initially closed before a large power increase causes the pellet temperature to increase and subsequently pellet volume increase due to thermal expansion. The amount of pellet volume increase is proportional to the power increase, and is larger when the pellet thermal conductivity is low, the latter being the case when the pellet temperature is high and when its burnup is high.

Stress-Corrosion-Cracking Failure Mode

The corrosive chemical interaction of iodine released from the irradiated pellets and zirconium cladding material is greatly accelerated under tensile stress. This process is called stress-corrosion-cracking (SCC). Thus, a strong PCI which generates high tensile stress is considered the direct cause for the corrosive cracking of the cladding material which may result in the breach of the cladding integrity and the release of radioactive material outside the cladding tube into the coolant. The prevention of this so-called PCI failure mode is the subject of this patent.

BRIEF DESCRIPTION OF PRIOR ART

The chemical, mechanical, and thermal processes that occur in the fuel rod are very complicated beyond the brief description given in the above section, and are extensively covered in the open literature such as cited here as references (1) through (5). These processes are commonly modeled using large computer programs for simulating fuel performance, so-called fuel performance codes. One such code is RODEX4 (reference 6), also known as SIERRA code (reference 7) used by AREVA, and there are other codes of the same class which are used by other organizations (for example STAV at Westinghouse Electric Sweden, PRIME at General Electric, FRAPCON at Pacific Northwest National Laboratory, FALCON at Anatech Inc.). The common attribute of all fuel performance codes is their high level of sophistication in modeling the fuel performance by solving a large number of equations describing numerous interacting local parameters. Fuel performance codes are used routinely for fuel rod design activities and also for post-failure analysis of the causes that lead to clad failure.

The application of fuel performance codes prior to a power maneuver in a reactor to predict whether large stresses will develop is an obvious extension to their field of applicability, however, the intensive computer resources required for such application is prohibitive particularly in the light of the large number of fuel rods in a reactor core.

The technique commonly used for achieving a measure of protection against PCI failure is the online application of empirical rules, also called maneuvering guidelines, to restrict the so-called linear heat generation rate in representative fuel rods and limit the time rate of its increase during a reactor power maneuver. The linear heat generation rate (LHGR) is also referred to as linear power or fuel duty, and is defined as the thermal power generated in a fuel rod per unit length measured in units of kW/ft or equivalently kW/m. Some maneuvering guidelines, relate the allowable LHGR to a reference LHGR value, interchangeably called the conditioned LHGR or the conditioned state LHGR or the conditioning state. The conditioned LHGR is qualitatively defined as the asymptotic operational LHGR where operation for sufficiently long time leads to mechanical equilibrium where the pellet-clad contact pressure presumably settles to a safe low value. By analogy to an athlete's training or conditioning, a fuel rod is capable of operating at high power because it has been trained or conditioned to operate at high power, and the reverse is true where a fuel gradually loses the capacity to operate at high power after operating for a period of time at low power. The time constants for the dynamic tracking of the conditioned state are generally obtained by empirical means using empirical formulas. According to the prior art maneuvering guides, reactor power increase using control rod motion is restricted such that the operating LHGR for a monitored rod at a given elevation does not exceed its conditioned state within a prescribed tolerance. Thus, the linear power, P, at a given elevation of a monitored fuel rod is restricted such that $$P \leq P_{CS} + \Delta P$$

where $P_{CS}$ is the conditioned state, and $\Delta P$ is an empirically prescribed tolerance.

For slow power increase maneuvers such as achieved by increasing the recirculation flow in a boiling water reactor, a ramp rate upper limit is prescribed where the ramp rate is defined as the time rate of increase of LHGR commonly measured in units of kW/ft/hr.

Although the above described empirical power maneuvering is applicable to both Boiling and Pressurized Water Reactors, local implementation (at the level of single fuel assembly segment or a single fuel rod segment) is common in Boiling Water Reactors. Pressurized Water Reactor maneuvering is commonly based on a global variable representing the entire core thermal power, taking advantage of the relative simplicity and invariance of power distribution in its core.

Maneuvering guidelines are largely based on experience derived from experiments with power ramping of sample rods in test reactors, trends of the results of fuel performance codes, and actual PCI failures in power reactors. Due to their empirical nature, a balance must be considered between the level of protection that can be achieved and the operational flexibility a reactor operator needs, with the result that only a limited success is possible and PCI failures may continue to occur at a reduced frequency.

PROBLEM TO BE SOLVED

PCI failures occur from time to time despite the occasional adjustment of the maneuvering guides following such events. The occurrence of fuel failures of any type requires power suppression and occasionally a mid-cycle outage, both are associated with environmental and economic cost. The space permitted for reactor power maneuvering evolved to minimal flexibility with each revision that introduces new conservatism to the maneuvering guidelines and power ascension is being restricted to slow rates that result in reducing the plant capacity factor and profitability. A novel method is needed to reliably prevent PCI failures while maintaining reactor power maneuvering flexibility.

REFERENCES

1. Donald R. Olander, "Fundamental Aspects of Nuclear Reactor Fuel Elements," Published by Technical Information Center, Office of Public Affairs, Energy Research and Development Administration, 1976, ISBN 0-87079-031-5 (v. 1)
2. John Gittus, ed., "Water Reactor Fuel Element Performance Computer Modelling," Applied Science Publishers LTD 1983, ISBN-0-85334-217-2
3. Proceedings of the International Topical Meeting on LWR Fuel Performance, Avingnon France, Apr. 21-24, 1991
4. Proceedings of the International Topical Meeting on Light Water Reactor Fuel Performance, West Palm Beach, Fla., Apr. 17-21, 1994
5. Proceedings of the International Topical Meeting on Light Water Reactor Fuel Performance, Portland Oreg., Mar. 2-6, 1997
6. M. R. BILLAUX, "Modeling Pellet-Cladding Mechanical Interaction and Application to BWR Maneuvering," Proceedings of the International Meeting on LWR Fuel Performance, Paper 1047, Orlando, Fla., Sep. 19-22, 2004

7. M. R. Billaux, S.-H. Shann, L. F. van Swam, F. Sontheimer, and H. Landskron, "SIERRA: A Code to Predict the Mechanical Behavior of LWR Fuel Rods," 14th International Conference on Structural Mechanics in Reactor Technology, Lyon France, Aug. 17-22, 1997

Patents and patent applications broadly related to the art of the invention herein are found as follows: Patent Application 2006165210A1 to Karve et al; U.S. Pat. No. 6,400,786 to Mourlevat et al; U.S. Pat. No. 6,430,247 to Mourlevat et al; U.S. Pat. No. 6,535,568 to Reese: Patent Application 2006/0146973 to Yeager et al.

The patents referred to herein are provided herewith in an Information Disclosure Statement in accordance with 37 CFR 1.97. The publications referred to herein will be provided, in accordance with 37 CFR 1.97 and 37 CFR 1.98 within the time allowed by said regulations.

SUMMARY OF THE INVENTION

The PCI related fuel failure problem associated with nuclear reactor power maneuvering is solved by this invention with introducing a new model that is:

1. A reduced order model, henceforth called XEDOR, in the sense that the number of equations and parameters are far fewer than existing fuel performance codes.
2. By virtue of its reduced order, its algorithmic representation in a computer code is so fast that it permits online application in the sense that predictive calculations are performed and the results taken into account prior to executing any power maneuver in a reactor.
3. It is physically based, unlike empirical maneuvering guides of the prior art, and therefore provides for a qualitatively higher degree of accuracy and reliability.
4. Capable of predicting the stress level and the associated LHGR margin to the maximum allowable limits, and doing so using definite representation of each fuel design parameters and material properties.
5. Of definite structure as to its formulas and internal variables and input-output compatibility with reactor monitoring software.

The model formulation is fundamentally based on first order differential equations describing the time evolution of the two main state variables, pellet-clad gap size and clad stress, and driven by the operating parameters obtained from the reactor instruments and monitoring software as represented by the linear heat generation rate and fast neutron flux for each fuel rod at several axial locations. Reactor operator is assisted in performing power maneuvers by being provided with timely information regarding the stress levels predicted by XEDOR for that maneuver, whereby the maneuver is allowed only provided that a stress threshold specific to the subject fuel type is not exceeded.

This application discloses a reduced order model, called XEDOR, for calculating stress and pellet-clad gap size in at least one fuel rod segment to provide information for core loading pattern design, operator power maneuvering and/or diagnostics of suspected PCI cladding failure comprising:

a. calculating a gap size evolution from its initial as-manufactured value by $$\frac{d\delta}{dt} = f(\sigma) - a_0 P - a_1 \frac{dP}{dt} \qquad (4)$$

and, b. calculating an evolution of clad hoop stress with time upon gap size reaching zero by $$\frac{1}{E}\frac{d\sigma}{dt} + f(\sigma) = a_0 P + a_1 \frac{dP}{dt} \qquad (3)$$

where t is time, δ is the pellet-clad gap size relative to clad inner radius, σ is clad hoop stress, E is clad material Young's modulus, the function $f$ is the clad inelastic strain rate as function of hoop stress while being irradiated with a given fast neutron flux level and having accumulated a fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power and, c. displaying the calculated parameters, σ and/or δ, for use in core loading pattern design, operator power maneuvering or diagnostics of suspected PCI cladding failure.

The calculated parameters, σ and/or δ, are displayed for use in core loading pattern design, operator power maneuvering or diagnostics of suspected PCI cladding failure and said calculated parameters are utilized in guiding the design of a core loading pattern of a nuclear reactor and used by an operator for power maneuvering and in the diagnosing of a suspected PCI cladding failure in a nuclear reactor all related to nuclear reactor operations.

A computer program named XEDOR is disclosed herein, which is inputted into a computer implementing the algorithms for calculating the gap size evolution from its initial as-manufactured value by $$\frac{d\delta}{dt} = f(\sigma) - a_0 P - a_1 \frac{dP}{dt} \qquad (4)$$

and, b. calculating the evolution of clad hoop stress with time upon gap size reaching zero by $$\frac{1}{E}\frac{d\sigma}{dt} + f(\sigma) = a_0 P + a_1 \frac{dP}{dt} \qquad (3)$$

where t is time, δ is the pellet-clad size relative to clad inner radius, σ is clad hoop stress, E is clad material Young's modulus, the function $f$ is the clad inelastic strain rate as function of hoop stress for given fast neutron flux level and cumulative fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power.

Regarding power maneuvering, the computer program XEDOR, provides the following:

a. tracking the maximum allowable linear power compared with the operating linear power in order to ensure that a safety margin to PCI fuel failure exists; projecting a safe power trajectory in order to plan maneuvers such as start up and control rod sequence exchange;

b. dividing the projected safe power trajectory into a safe power jump followed by a continuous safe power ramp;

c. predicting a safe power jump by determining the gap and hoop stress when a safe power trajectory projection is requested; calculating the safe power jump as the power corresponding to thermal expansion that consumes the present gap plus clad elastic strain corresponding to a given safe stress setpoint;

d. predicting an instantaneous power ramp rate where the stress increase due to pellet thermal expansion is balanced by the stress relief due to creep in the cladding material, the power ramp rate being limited to $$R = (f(\sigma^*) - a_0 P)/a_1 \qquad (12)$$

e. predicting a continuous power ramp [0040] by limiting the power increase rate such that the stress increase due to pellet thermal expansion is balanced by the stress relief due to creep in the cladding material, wherewith the linear power is calculated from $$a_1 \frac{dP}{dt} + a_0 P = f(\sigma^*) \qquad (11)$$

which is integrated numerically by the reduced order model XEDOR whenever a safe power projection over a period of time is requested by the reactor operator;

f. displaying the predicted safe power jump and power ramp for nuclear reactor operations and for operator consideration in power maneuvering for nuclear reactor operators for safe power jump and power ramp and in guiding the design of a core loading pattern of a nuclear reactor.

Regarding power maneuvering, the disclosed computer program XEDOR, is utilized as follows:

a. inputting into a computer a reduced order computer code XEDOR wherein algorithmic representations, in a computer code, receive data from core instrumentation and monitoring software programs thereby permitting online application for predictive calculations which are performed and yielding calculations prior to executing any power maneuver in a reactor;

b. displaying said calculations in physical operator displays for operator consideration where calculations are physically based, unlike empirical maneuvering guides, and providing a qualitatively higher degree of accuracy and reliability for power maneuvering safety;

c. demonstrating, via the operator display, calculations which are predictive of the stress level and the associated linear heat generation rate margin to the maximum allowable limits using definite representation of each fuel design parameters and material properties.

Again, regarding power maneuvering, the program XEDOR, with XEDOR algorithms, is loaded into a computer having a computer-readable storage medium having computer program logic stored thereon for enabling a processor to execute the XEDOR algorithm, which, upon receipt of operational data from a reactor core monitoring system, calculates margin to PCI failure with said calculations displayed and used for reactor operator and reactor operations use for executing a safe power maneuver.

BRIEF DESCRIPTION OF THE DRAWINGS

FIG. 5: Pellet-clad gap size evolution calculated by RODEX4 and XEDOR for a hypothetical control rod withdrawal error event resulting in large increase in linear power. The control rod withdrawal error occurred in the simulation when the pellet-clad gap was closed.

FIG. 6: Hoop stress calculated by RODEX4 and XEDOR for the same hypothetical control rod withdrawal error illustrated by FIG. 5. The calculations show a large stress spike at the same time for both calculations.

FIG. 7: Hoop stress calculated by RODEX4 and XEDOR for the same hypothetical control rod withdrawal error mentioned in reference to FIG. 6. This figure is a zoom of FIG. 6 to provide high resolution of the large stress spike showing the good agreement between the high order model computer code RODEX4 and the reduced order model XEDOR.

FIG. 8: Operating linear power and maximum allowed linear power calculated by XEDOR for the same hypothetical control rod withdrawal error mentioned in reference to FIG. 7. The linear power at the time of the simulated control rod withdrawal error coinciding with the high predicted stress is shown to violate the XEDOR calculated maximum allowable value.

FIG. 9: Projected safe linear power example. The shown initial power jump brings the hoop stress level in the cladding to a given safe value. Further power rise is permitted with a decreasing slope to maintain the same stress level. The figure shows the margin of the projected power compared with the maximum allowable value where the latter corresponds to a stress failure threshold. The conditioning state is also shown to demonstrate that the safe power trajectory proceeds on a parallel path with the conditioning state of the fuel.

Figure 1:
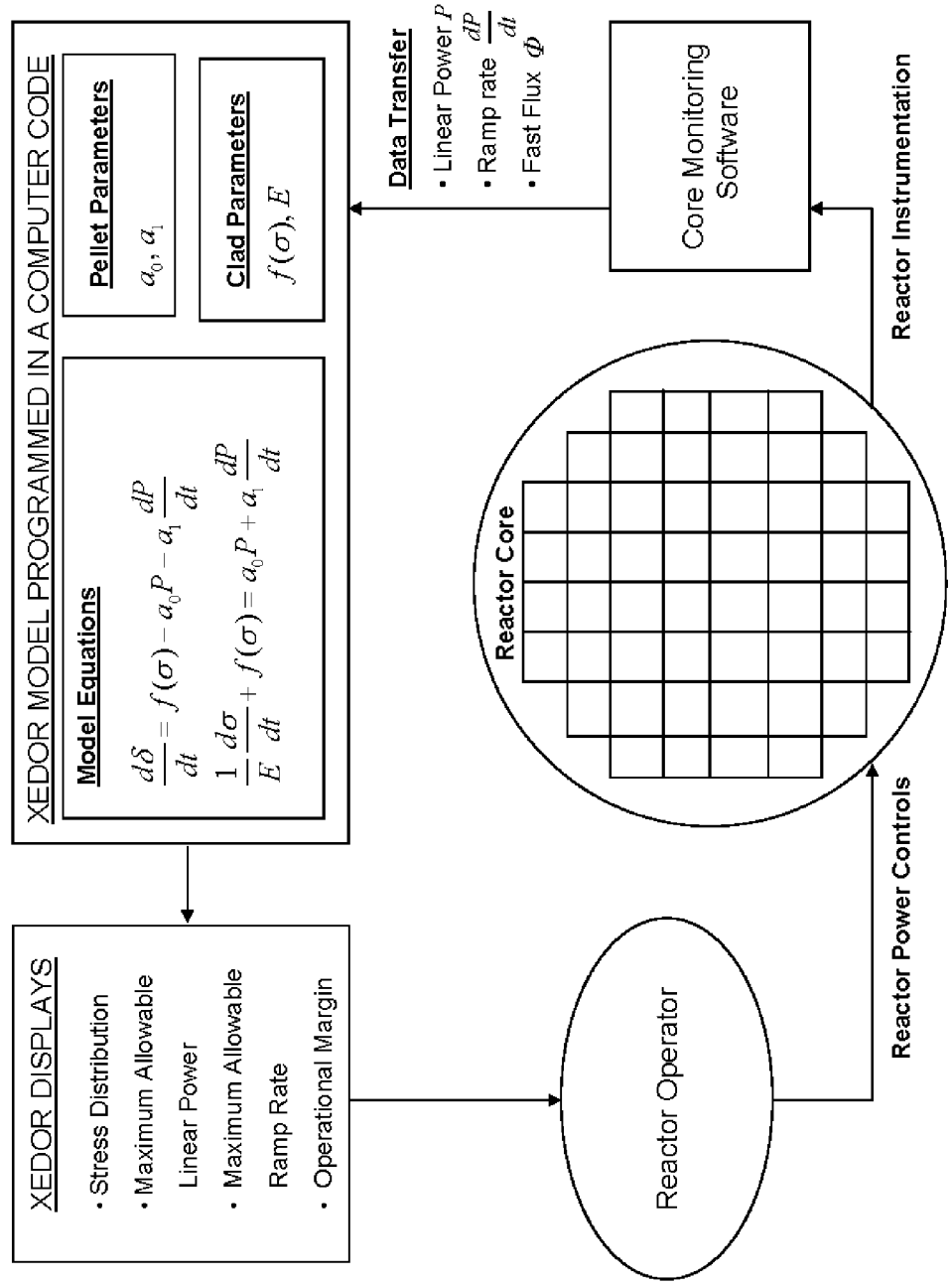
FIG. 1: A flow chart showing the embodiment of the invention as coupled to the reactor core instrumentation and monitoring system to provide input to the XEDOR system where gap size and stresses are calculated as the main variables, and showing the XEDOR output displays for the reactor operator who in turn affects the reactor power maneuver through the reactor controls within the margins displayed by XEDOR.

The foregoing and other features and advantages of the present invention will become more readily appreciated as the same become better understood by reference to the following detailed description of the preferred embodiment of the invention when taken in conjunction with the accompanying drawings, wherein:

DETAILED DESCRIPTION

A model is developed to calculate hoop stress in the clad when the pellet-clad gap is closed, at which condition the pellet-clad contact pressure contributes a tensile component. When the gap is open, hoop stress is a result of the external coolant pressure contributing a compressive component, which results in a nearly constant stress when the variation of inner clad gas pressure is recognized as insignificant. The model therefore needs to calculate the gap size and transition to a dynamic stress calculation when the gap is closed. A conceptual model is outlined below.

For the condition of a closed gap, the cladding relative dimensional change, also known as strain, is driven by the pellet's relative dimensional change. The clad strain rate balance is written as Elastic strain rate+Inelastic strain rate=Pellet-expansion-imposed strain rate.

Thus, the stress equation is formulated as $$\frac{1}{E}\frac{d\sigma}{dt} + f(\sigma) = g(t) \tag{1}$$

where the ratio between the clad stress, $\sigma$, and its elastic strain is the so-called Young's modulus, E. The function, $f(\sigma)$, signifies the clad inelastic strain rate, also known as creep rate. The function, $g(t)$, signifies the rate of the pellet relative dimensional change as function of time.

The strain imposed by the pellet as a given time, G(t), is the sum of two components: the first is due to the cumulative burnup which is proportional to the power integral, and the second due to thermal expansion which is proportional to the power itself. Thus, $$G(t) = a_0 \int P(t)dt + a_1 P(t) \tag{2}$$

where, P is the linear heat generation rate in the pellet, the coefficient $a_0$ is the pellet strain rate per unit change in linear heat generation rate, and the coefficient $a_1$ is the pellet strain resulting from a unit increase in linear heat generation rate.

With $g(t)=dG(t)/dt=a_0 P+a_1 dP/dt$, Equation (1) becomes, $$\frac{1}{E}\frac{d\sigma}{dt} + f(\sigma) = a_0 P + a_1 \frac{dP}{dt} \tag{3}$$

For the alternative condition of an open gap, the clad hoop stress is negative and is assumed to be a constant dominated by the external coolant pressure. Clad creep down under compressive hoop stress in combination with pellet volume eventual increase under neutron irradiation will gradually close the gap. The calculation of gap size is important in modeling stress because, for power ramps starting with an open gap and terminating with a closed gap, the peak stress level depends on the initial gap size, where an initially large gap size results in a reduced stress peak and vice versa. Also, transitioning to Eq. (3) for calculating stress is triggered by reaching a zero gap size, the determination of which requires a calculation to track the evolution of the gap size.

The evolution of the gap size, $\delta$, measured in strain units (relative to the inner clad radius) is obtained from the difference of the dimensional change of the two surfaces (inner clad surface and outer pellet surface) defining the gap. Therefore, the rate of relative gap size change is given by $d\delta/dt=f(\sigma)-g(t)$, which is equivalent to, $$\frac{d\delta}{dt} = f(\sigma) - a_0 P - a_1 \frac{dP}{dt} \tag{4}$$

The initial gap size, $\delta_0$, needed to solve Eq. (4) is required as a model input, which is provided by fuel manufacturer as a fuel rod characteristic.

The differential equations (3) and (4), for tracking the main state variables identified as clad stress and pellet-clad gap size respectively, constitute the main structure of the XEDOR system. All the physics in the XEDOR model is contained in $a_0$, $a_1$, and $f$; these are fitted to quantitatively approximate the behavior of a detailed fuel performance code. The present reduced order model is fitted to AREVA's fuel performance code RODEX4 and is applicable for use with other fuel performance codes. The basic features of the parameters are outlined below.

The coefficient $a_0$ is generally dependent on burnup. Its functional form allows the model to represent the fuel swelling process as well as the short-term densification resulting from the reduction of unstable pores that exist in the fuel pellet ceramic material. The long-term densification process at the expense of stable pores, also known as accommodation, is also represented. An example of the parameter $a_0$ is given below:

$$a_0 = 2.6 \times 10^{-8} - 10^{-5} p_u e^{-B/2.3} - 10^{-6} p_s e^{-B/25} + 6 \times 10^{-9} [\exp(P/50)-1] \tag{5}$$

where B is the burnup in MWd/kgU, $p_u$ is the fraction of unstable pores in the ceramic pellet material, and $p_s$ is the fraction of stable pores in the same material.

The coefficient, $a_1$, which is related to the thermal expansion of the fuel pellet, is generally dependent on burnup and the pellet temperature, which in turn depends on the linear power level, P. The value of the coefficient $a_1$ increases with both burnup and power in order to account for the degradation of fuel thermal conductivity. Thus, the temperature response to a given increase in power, and consequently the thermal expansion response, is larger for higher burnup and higher initial linear power level. An example of the parameter $a_1$ is given below:

$$a_1 = [1.3 \times 10^{-5} + 5.7 \times 10^{-5} P + 1.6B]e^{P/50} + 3 \times 10^{-5} \tag{6}$$

The stress relaxation in the clad is directly linked to the inelastic strain rate given by the function $f(\sigma)$. Cladding inelastic strain rate is a strongly nonlinear function of stress, and is induced by the high energy portion of the neutron flux, also called fast flux, $\Phi$, and increases with temperature. A so-called thermally induced creep component occurs under stress without requiring a fast neutron field, which is distinguishable from the so-called irradiation-induced creep that requires both stress and fast neutron flux. The form of the clad creep function allows for the so-called primary creep stage where the creep rate is initially large, followed by secondary creep stage which occurs at a reduced, almost constant, rate under the same stress. This transition from primary to secondary creep is attributed to the so-called strain hardening, where the thermally induced creep produces an effect on the material microstructure retarding further creep. An example for the clad creep function is given below as $$f(\sigma) = c_T \sin h(s\sigma) + c_{IRR} \sigma^v \Phi^w \tag{7}$$

where the first term accounts for the thermal-induced creep and the second term accounts for the irradiation-induced creep. The thermal creep coefficient, $c_T$, generally increases with clad temperature and decreases with the accumulated exposure to fast neutrons (fast fluence) and decreases with the accumulated strain. The irradiation induced component of the creep rate increases with stress and fast neutron flux. The set of coefficients, ($c_T$, s, $c_{IRR}$, v, w) determine the magnitude of the creep rate function.

The creep rate function, $f(\sigma)$, is written explicitly as a function of clad stress because the latter is a major state variable in the model, the definition of the creep rate function implies its dependence on fast neutron flux. It also accounts for cladding material anisotropy and is specific to a particular type of zirconium alloy and heat treatment. The model parameters, or set of coefficients, defining a creep rate function are therefore fitted for application to a given clad material and heat treatment, and the resulting creep function is applicable to any irradiation environment including boiling and pressurized water reactors.

Alternative methods for providing the coefficients and material property functions, $a_0$, $a_1$, and $f(\sigma)$, include tabulated data obtained from a combination of experimental measurements and fuel performance code results for specific fuel rod materials. Such tabulated data can be used directly or in a numerically fitted form.

The representation of stress as the true physical parameter responsible for PCI fuel failure is not the only method of providing such information to the reactor operator. An alternative representation of the margin that exists before PCI failure is based on calculating the maximum allowable linear power at which the maximum allowable stress is reached. The margin parameter based on the difference, or ratio, between the maximum allowable and the present linear powers can be a preferable one as it given in power units and therefore directly linked to the power maneuver. However, it must be mentioned that while a maximum allowable stress is a single value for each fuel type, the maximum allowable linear power varies with time for each rod segment according to its operational history. The stress margin and the linear power margin are therefore equivalent in providing the operational limits on power maneuvering.

Fuel Conditioning and De-Conditioning

The concept of conditioning is deeply embedded in the paradigm of fuel behavior and its response to power change. A benefit of this reduced order model is to provide a rigorous interpretation of the conditioning process leading to a well-defined conditioning state. This new conditioning state is beneficial as it provides for conceptual continuity of understanding bridging the gap between the empirical prior art and the physical modeling of this invention as embodied in XEDOR. The new conditioning state can be also used to define more precise maneuvering rules superior to the empirical rules of the prior art, but not better than a full implementation of XEDOR, thus serving as an intermediate step that is easy to implement with minimal change to existing reactor monitoring software and also easy for reactor operator as minimal, if any, training is needed.

Conditioning a segment of a fuel rod by operating at this conditioning level LHGR for a sufficiently long time implies that a state of mechanical equilibrium is assumed to exist under these conditions where hoop stress reaches an asymptotic value, and the inelastic strain (creep) rate becomes constant. Mathematically, the properties of the new time-dependent conditioned state, $\Pi(t)$, satisfy the following conditions:
1. The conditioned state, $\Pi(t)$, is attracted to the linear power, $P(t)$.
2. The conditioning state, $\Pi(t)$, is a continuous function of time, in contrast with $P(t)$, which is not necessarily continuous.
3. Operating under linear power below the conditioning state is always safe. Given that a stress threshold, $\sigma^*$, in the approximate range of 200-400 MPa, exists for causing fuel failure, the conditioning state satisfies the inequality $$\sigma(t) < \sigma^* \text{ for } P(t) < \Pi(t) \tag{8}$$

The property given in Equation (8) is behind the main interest in conditioning state. Specifically, given that a conservative stress threshold is known or implied from experience and testing of a particular cladding material, then a maximum allowable linear power can be obtained from the conditioning state plus an overshoot or a tolerance to allow the stress to increase from the relatively low value associated with the conditioning state to the maximum safe stress threshold. Thus, the relationship governing the restriction of the local linear power, P, is given by $$P \leq \Pi(t) + \Delta P \tag{9}$$

which differs from the prior art in the important aspect that the empirical conditioned state, $P_{CS}$, is replaced by the new conditioning state, $\Pi$, where the latter is defined rigorously as presented below.

A conditioning state satisfying the properties mentioned above is introduced in the context of the new reduced order model of this invention, XEDOR, by replacing $P(t)$ with $\Pi(t)$ in Eq. (3) while dropping the stress derivative term because the stress presumably reached a constant signifying mechanical equilibrium. Thus, $$a_1 \frac{d\Pi}{dI} + a_0 \Pi = f(\sigma) \tag{10}$$

where the source term is the clad inelastic strain rate driven by the time-dependent stress, $\sigma(t)$, which is obtained by integrating the XEDOR system of equations. For the conditioning state equation to be integrated, an initial conditioning state is required, which is given an appropriate value depending on fuel type in the approximate range of 35-45 kW/m. A precise value of the initial conditioning is not important as its effect will decay in time.

Inspecting Eq. (10), we note that a linear power increase results in increasing stress and subsequently increasing the strain rate and leads to a continuous increase of $\Pi$. This increase of the conditioning function to catch up with an increase in linear power is precisely the XEDOR-specific meaning of "conditioning," while the opposite direction is termed "deconditioning."

It should be noted that the equation for calculating the new conditioning state, $\Pi$, applies only when the pellet-clad gap is closed. For the condition when the gap is open, the conditioning state is defined as the linear power required to cause pellet thermal expansion sufficient to close the gap and apply pressure on the clad to reach a specific given conditioning stress, the later being of the approximate range of 30-100 MPa. The open gap conditioning state is not a limiting factor in restricting operation, but it serves as an initial condition for the critical stage in fuel operation when the gap becomes closed.

It should be noted that the mechanical equilibrium that was assumed is not strictly attainable under constant linear power operation, due to the change in the material properties mainly due to the hardening that occurs with accumulated creep. This illustrates why the application of the conditioning state, $\Pi$, albeit obviously superior to the prior art as basis for maneuvering, a less accurate method compared with direct use of XEDOR calculated stress as basis for PCI protection during reactor power maneuvering. The XEDOR model differential equations (3) and (4) are used directly to evaluate power maneuvers and predict safe power trajectory without the need of any conditioning concept. The conditioning parameter, as rigorously defined and contained in the variable Π, is a novel construct to be utilized for providing continuity for the human operator of the nuclear power plant upon transition from an empirical maneuvering guide to the physically based reduced order model.

Modes of XEDOR Applications

The flow chart of FIG. 1 shows the embodiment of the invention as coupled to the reactor core instrumentation and monitoring system to provide input to the XEDOR system where gap size and stresses are calculated as the main variables, and shows the XEDOR output displays for the reactor operator who in turn affects the reactor power maneuver through the reactor controls within the margins displayed by XEDOR.

Figure 2:
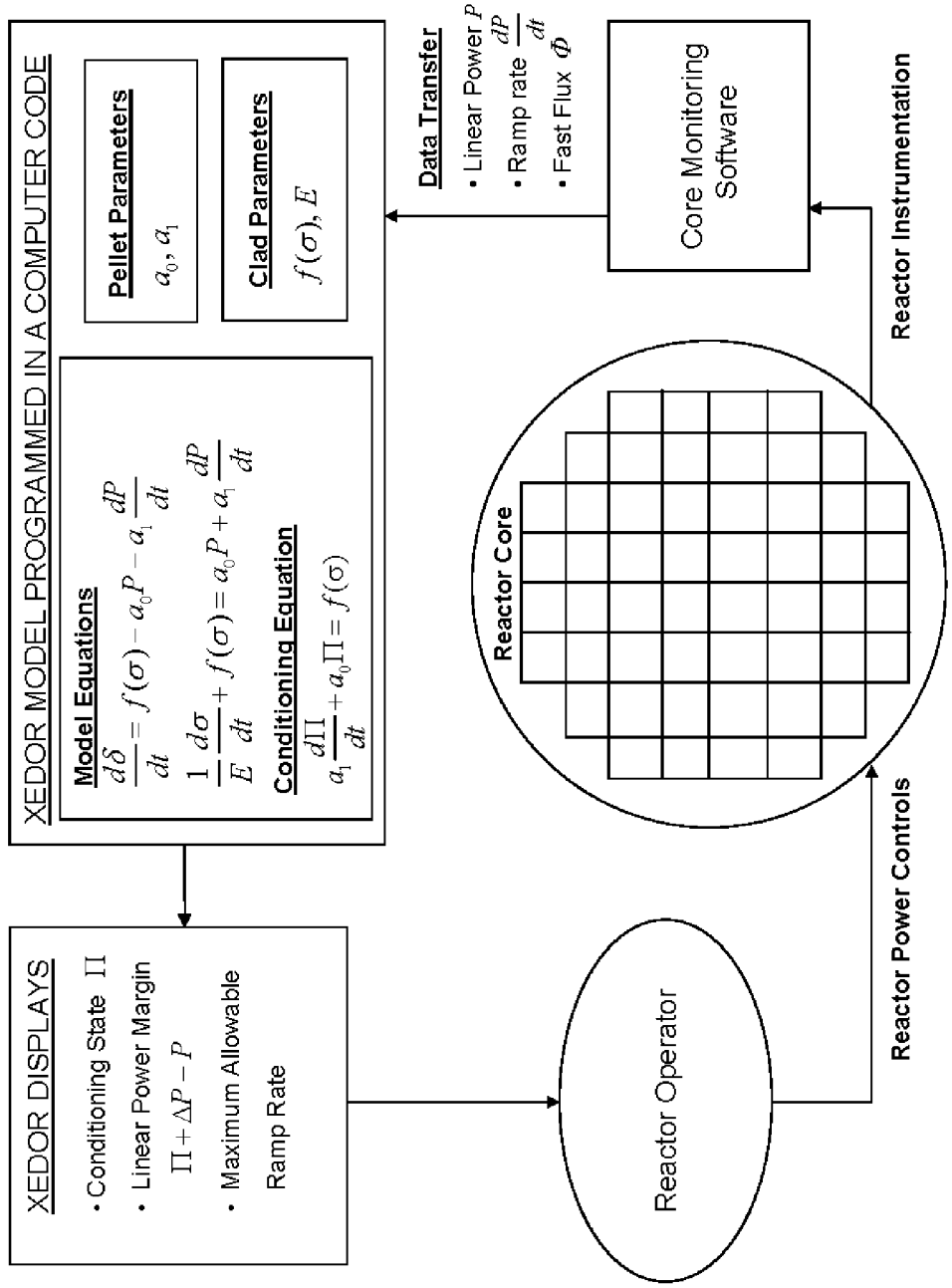
FIG. 2: A flow chart showing the embodiment of the invention as coupled to the reactor core instrumentation and monitoring system to provide input to the XEDOR system where the conditioning state is calculated as the main variable in addition to gap size and stress, and showing the XEDOR output displays for the reactor operator who in turn affects the reactor power maneuver through the reactor controls within the margins displayed by XEDOR.

The flow chart of FIG. 2 shows the embodiment of the invention as coupled to the reactor core instrumentation and monitoring system to provide input to the XEDOR system where the conditioning state is calculated as the main variable in addition to gap size and stress, and shows the XEDOR output displays for the reactor operator who in turn affects the reactor power maneuver through the reactor controls within the margins displayed by XEDOR.

Figure 3:
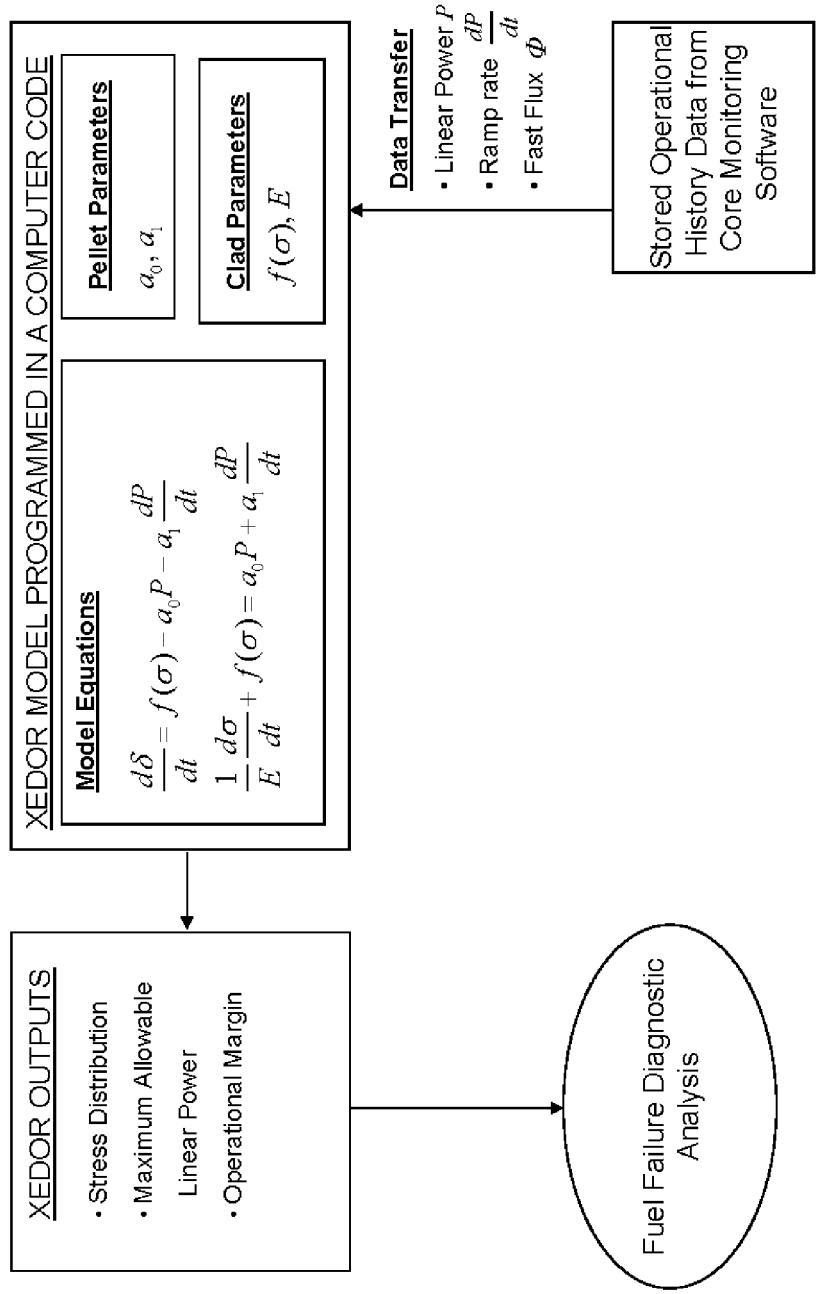
FIG. 3: A flow chart showing the application of the invention as a computer code XEDOR provided with input representing operational data that was previously stored. The result of the calculations performed by XEDOR as a diagnostic tool is used by an analyst for the purpose of identifying the fuel assemblies or rods where the PCI margins represented as stress or linear power may have been violated.

The flow chart of FIG. 3 shows the application of the invention as a computer code XEDOR provided with input representing operational data that was previously stored, e.g. by the reactor monitoring software. The result of the calculations performed by XEDOR as a diagnostic tool is used by an analyst for the purpose of identifying the fuel assemblies or rods where the PCI margins represented as stress or linear power may have been violated. This is particularly helpful in speeding up the process of identifying and removing a failed fuel assembly to restore reactor operation to normal as soon as possible.

Figure 4:
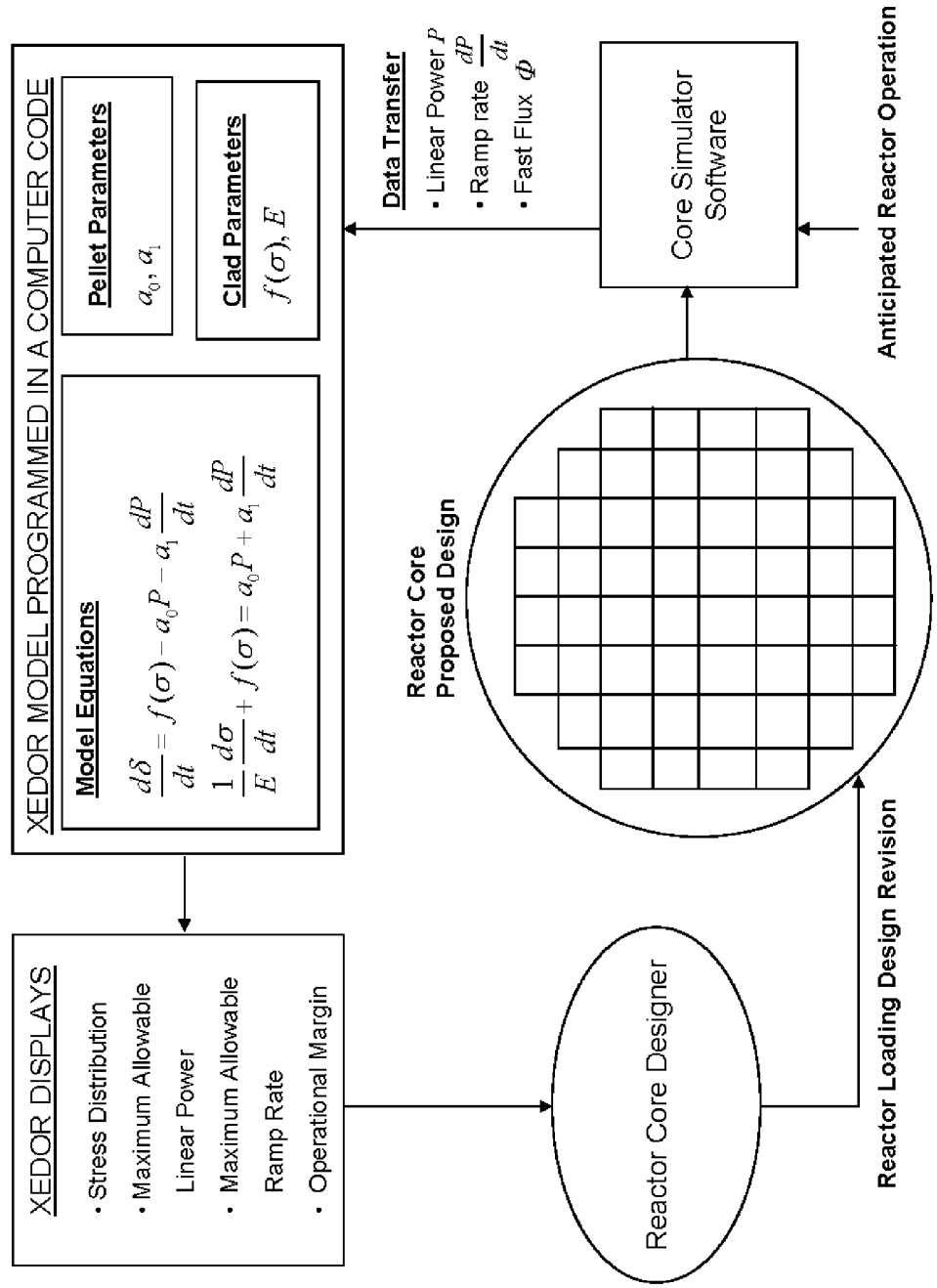
FIG. 4: A flow chart showing the application of the invention as a computer code XEDOR provided with input representing anticipated operational data for a reactor core loading in the design stage. The result of the calculations performed by XEDOR as a design optimization tool is used by an analyst for the purpose of identifying the fuel assemblies or rods where the PCI margins represented as stress or linear power may become violated. If such violation, or unacceptably small margins, were found, the analyst is enabled to revise the fuel loading pattern until an acceptable pattern is obtained with sufficient PCI margin during anticipated operation.

The flow chart of FIG. 4 shows the application of the invention as a computer code XEDOR provided with input representing anticipated operational data for a reactor core loading in the design stage. The result of the calculations performed by XEDOR as a design optimization tool is used by an analyst for the purpose of identifying the fuel assemblies or rods where the PCI margins represented as stress or linear power may become violated. If such violation, or unacceptably small margins, were found, the analyst is enabled to revise the fuel loading pattern until an acceptable pattern is obtained with sufficient PCI margin during anticipated operation.

Example Application

An example of a hypothetical control rod withdrawal error is presented here to demonstrate the XEDOR model in comparison with RODEX4 and to validate the accuracy of the novel reduced order model compared with large fuel performance code. FIG. 5 depicts the evolution of the size of the pellet-clad gap at a selected elevation of a particular fuel rod. The calculation demonstrates good comparison between the two methods, and shows the important features of an initially increasing gap due to pellet densification followed by gradual closure of the gap. Gap size variations due to pellet thermal expansion following power changes can be discerned. FIG. 6 shows the hoop stress calculated by RODEX4 and XEDOR, where a large spike is calculated due to the sudden power increase resulting from a postulated control rod withdrawal error. FIG. 7 is a zoom of FIG. 6 around the power (and stress) spike time to show the details of the stress evolution calculated by the two methods. The high stress (>500 MPa for RODEX4 and >600 MPa for XEDOR) constitute a severe violation of the safe operation threshold and fuel failure would be expected. This is demonstrated in FIG. 8 where the operating linear power is shown to exceed the maximum allowable linear power (corresponding to a maximum allowable hoop stress) as calculated by both methods.

Monitoring a BWR with XEDOR

The example shown above demonstrates one aspect of the monitoring function that can be performed with XEDOR, mainly tracking the maximum allowable linear power compared with the operating linear power in order to ensure that a safety margin exists. The other important function is projecting a safe power trajectory in order to plan maneuvers such as start up and control rod sequence exchange.

The projected power trajectory is divided into a power jump followed by a continuous power ramp. These are calculated as follows.

Safe Power Jump

The XEDOR state variable set is available up to the point where a safe power trajectory projection is requested, i.e. the gap and hoop stress are known. The safe power jump is then calculated as the power corresponding to thermal expansion that consumes the present gap (if any exists) plus clad elastic strain corresponding to a given safe stress setpoint, also called threshold stress or maximum allowable stress, $\sigma^*$. In this way, a large power jump would be predicted if the initial state is defined by an open gap, while a smaller power jump would be predicted if the initial state is defined by a closed gap, and even smaller if a large hoop stress is initially present. The magnitude of the predicted power jump is also dependent on the initial power and burnup, as high power (i.e. high temperature) and burnup result in pellet thermal conductivity degradation and thus increasing the thermal expansion strain response to power increase.

Safe Power Ramp

The pellet-clad gap is always closed following a power jump to a predetermined safe stress level, $\sigma^*$. The subsequent allowed safe power increase must be limited to a ramp rate where the stress increase due to pellet thermal expansion is balanced by the stress relief due to creep in the cladding material. This is calculated by reversing Eq. (3) in the sense of using power as the independent variable, while specifying stress as a constant. With the stress derivative vanishing, Eq. (3) is rewritten as $$a_1 \frac{dP}{dt} + a_0 P = f(\sigma^*) \tag{11}$$

The safe ramp rate, R=dP/dt, can thus be calculated from $$R = (f(\sigma^*) - a_0 P)/a_1 \tag{12}$$

Equation (11) is integrated numerically by the XEDOR computer code whenever a safe power projection over a period of time is requested by the reactor operator. Equation (12) provides an instantaneous value of the maximum allowed ramp rate which is applicable over a short period of time. Following a series of power increase steps following the ramp rate provided by equation (12) results in linear power increase after each step which reduced the allowed ramp rate for the subsequent step; this procedure is equivalent to numerical integration of equation (11) to obtain an projected linear power curve bounding allowed power maneuvers.

An example of a power jump followed by a projected safe power ramp is given in FIG. 9. The plot shows the power jump and the subsequent ramp function, in addition to the maximum allowable power which corresponds to a higher stress than the projected power in order to keep a safety margin. The conditioning power is also shown to rise in response to the attracting operating linear power function. It is important to notice that the projected safe linear power runs nearly parallel to the conditioning state power, illustrating the applicability of the maneuvering method according to equation (9) where the projected safe linear power is larger than the conditioning state power by a nearly fixed quantity, ΔP.

Structure of Reactor Monitoring Software for PCI Protection

The structure of the power maneuvering function using XEDOR as coupled to a core monitoring system includes the following elements as a preferred embodiment:

1. A computer based core monitoring system capable of reading reactor control state such as position of control rods, flow rate, and total core thermal power.
2. A software module capable of simulating the detailed core state such as three-dimensional distributions of neutron flux and power. The software is capable of calculating such parameters as fast neutron flux and linear heat generation rate for every fuel rod and at different elevations. The software is capable of integrating fast neutron flux to get the fast neutron fluence, and integrating power density to get burnup, for each rod at several elevations.
3. A computer module to embody the algorithmic representation of XEDOR, namely equations (3) and (4), capable of integrating same equations to obtain the state variables representing stress and gap size for each rod at different elevations. For this state variable integration, the initial conditions are the gap size representative of the fuel rod as manufactured, and the stress level imposed by the external coolant pressure. The driving parameters are linear heat generation rate and fast flux provided by the host core monitoring system. The integrated parameters of the fast fluence and burnup are also provided by the host core monitoring software.
4. A display of the stress level distribution in the core, and the associated margin to maximum allowable LHGR. The reactor operator utilizes this margin information to decide on whether a planned power maneuver is safe.
5. A display of the maximum allowable rate of increasing LHGR to guide the reactor operator action regarding power ascension by flow control or control rod motion.

The functions performed by the XEDOR system include:
1. Using the data provided online by a nuclear plant monitoring and instrumentation system, calculate the stress distribution in many or all fuel rods in the reactor core at several axial locations.
2. Calculate a parameter, for each fuel rod segment representing an axial location, to identify the margin to reaching an operator provided stress limit. Such parameter can be the linear power required to reach the stress limit, or the linear power increase above the existing level at the time required to reach the stress limit, or the ratio between the maximum linear power associated with the stress limit and the existing linear power at the time, or other convenient parameter to provide the operator with information regarding the operation margin to reaching the stress limit.
3. Project in a predictive manner the time evolution of the linear power at each rod segment in the core designated for such calculation conditional on stress remaining at or below an operator provided value.
4. Perform one or more of the above functions listed in items 1 through 3 online, i.e. while directly connected to the reactor instrumentation and monitoring software.
5. Perform the stress survey and related functions listed in items 1 through 3 offline using stored data obtained from reactor instrumentation and monitoring systems.
6. Perform the function of item 5 for the purpose of identifying a failed fuel assembly and further identifying the location of a failed fuel rod in the fuel assembly.
7. Perform the stress survey and related functions using design data for the purpose of optimizing the loading pattern of different fuel assemblies in a reactor core, and the associated planned power maneuvers. The latter include control rod sequences for boiling water reactors, and reactivity management with soluble boron and control rod motion for pressurized water reactors.

A Summary

Disclosed here is a preferred embodiment of a reduced order model for calculating stress and pellet-clad gap size in at least one fuel rod segment to provide information for core loading pattern design, operator power maneuvering and or diagnostics of suspected PCI cladding failure comprising and calculating a gap size evolution from its initial as-manufactured value by $$\frac{d\delta}{dt} = f(\sigma) - a_0 P - a_1 \frac{dP}{dt} \qquad (4)$$

and,
and calculating an evolution of clad hoop stress with time upon gap size reaching zero by $$\frac{1}{E}\frac{d\sigma}{dt} + f(\sigma) = a_0 P + a_1 \frac{dP}{dt} \qquad (3)$$

where t is time, $\delta$ is the pellet-clad gap size relative to clad inner radius, $\sigma$ is clad hoop stress, E is clad material Young's modulus, the function $f$ is the clad inelastic strain rate as function of hoop stress while being irradiated with a given fast neutron flux level and having accumulated a fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power and, displaying the calculated parameters, $\sigma$ and/or $\delta$, for operator use in power maneuvering.

The reduced order is further explained by noting that the parameter $a_0$ is determined by $$a_0 = 2.6\times10^{-8} - 10^{-5} p_u e^{-B/2.3} - 10^{-6} p_s e^{-B/25} + 6\times10^{-9}[\exp(P/50) - 1], \qquad (5),$$

where B is the burnup in MWd/kgU, P is the linear power in kW/m, $p_u$ is the fraction of unstable pores in the ceramic pellet material, and $p_s$ is the fraction of stable pores in the same material. Further, the parameter $a_1$ is determined by $$a_1 = [1.3\times10^{-5} + 5.7\times10^{-5} P + 1.6 B] e^{P/50} + 3\times10^{-5}, \qquad (6)$$

and is generally dependent on burnup and linear power level and additionally where the clad creep rate function $f(\sigma)$ is determined by $$f(\sigma) = c_T \sin h(s\sigma) + c_{IRR} \sigma^v \Phi^w, \qquad (7)$$

and is generally dependent on stress and fast neutron flux, $\Phi$, with the coefficient set $c_T$, s, $c_{IRR}$, v, w being specific to clad material and heat treatment.

Additionally it is seen that the reduced order model may further comprise the parameters $a_0$ and $a_1$ and function $f(\sigma)$ being in tabulated form or fitted by curve fitting means to a combination of experimental measurements of pellet and clad material properties and the results of large scale fuel performance codes.

Seen in this disclosure are a number of expressions of the invention. Seen is a method further comprising tracking the maximum allowable linear power compared with the operating linear power in order to ensure that a safety margin to PCI fuel failure exists; projecting a safe power trajectory in order to plan maneuvers such as start up and control rod sequence exchange. Further is seen the step of dividing the projected safe power trajectory into a safe power jump followed by a continuous safe power ramp and predicting a safe power jump by determining the gap and hoop stress when a safe power trajectory projection is requested; calculating the safe power jump as the power corresponding to thermal expansion that consumes the present gap plus clad elastic strain corresponding to a given safe stress setpoint. An additional step in the method is predicting an instantaneous power ramp rate where the stress increase due to pellet thermal expansion is balanced by the stress relief due to creep in the cladding material, the power ramp rate being limited to $$R = (f(\sigma^*) - a_0 P)/a_1, \quad (12),$$

and then predicting a continuous power ramp [0040] by limiting the power increase rate such that the stress increase due to pellet thermal expansion is balanced by the stress relief due to creep in the cladding material, wherewith the linear power is calculated from $$a_1 \frac{dP}{dt} + a_0 P = f(\sigma^*), \quad (11)$$

which is integrated numerically by the XEDOR computer code whenever a safe power projection over a period of time is requested by the reactor operator. Thereafter is the step of displaying the predicted safe power jump and power ramp for operator consideration in power maneuvering.

As additional disclosure of this invention we see the reduced order model of the preferred embodiment where said calculated parameters are for operator use in power maneuvering in either a Boiling Water Reactor or a Pressurized Water Reactor and said calculated parameters, $\sigma$ and $\delta$, are displayed for operator use in power maneuvering.

An alternative approach to the invention is seen in the method of using reduced order models for fast calculation of cladding stress in the majority of the fuel rods at different elevations of a reactor core for the purpose of calculating margin to and protecting against PCI failures comprising with a step of inputting into a computer a computer program implementing the algorithms for calculating the gap size evolution from its initial as-manufactured value by $$\frac{d\delta}{dt} = f(\sigma) - a_0 P - a_1 \frac{dP}{dt}, \quad (4)$$

and, calculating the evolution of clad hoop stress with time upon gap size reaching zero by $$\frac{1}{E} \frac{d\sigma}{dt} + f(\sigma) = a_0 P + a_1 \frac{dP}{dt}, \quad (3)$$

where t is time, $\delta$ is the pellet-clad size relative to clad inner radius, $\sigma$ is clad hoop stress, E is clad material Young's modulus, the function $f$ is the clad inelastic strain rate as function of hoop stress for given fast neutron flux level and cumulative fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power. Additionally, inputting, into the computer, core instrumentation measurements, using said measurements to provide input to core monitoring software, accessing the monitoring software generated operational data of linear heat generation rate, fast flux, burnup, fast neutron fluence, for all or the majority of the fuel rods at several axial locations and calculating, by the computer program, the gap size and clad stress when the gap is closed. Thereafter, outputting, to an operators display, the stress response to a planned power increase, as operational guidance for power maneuvering.

Additionally there may be seen the steps of calculating the linear heat generation rate maximum allowable limit based on the calculated stress and outputting same for operational guidance, calculating the margin to reaching the maximum allowable linear heat generation rate and outputting same for operational guidance and calculating the margin in terms of total reactor thermal power to any rod segment reaching the maximum allowable linear heat generation rate and outputting same for operational guidance.

Additionally seen, as further consideration of an alternative embodiment, is that the core instrumentation measurements and monitoring software may be from a Boiling Water Reactor or from a Pressurized Water Reactor.

An additional view, seen in an alternative embodiment, is a reduced order model to reduce PCI failure in power maneuvering comprising the steps of inputting into a computer a reduced order model XEDOR wherein algorithmic representations, in a computer code, receive data from core instrumentation and monitoring software programs thereby permitting online application for predictive calculations which are performed and yielding calculations prior to executing any power maneuver in a reactor. Further will be seen the steps of displaying said calculations in physical operator displays for operator consideration where calculations are physically based, unlike empirical maneuvering guides, and providing a qualitatively higher degree of accuracy and reliability for power maneuvering safety. And additionally the steps of demonstrating, via the operator display, calculations which are predictive of the stress level and the associated linear heat generation rate margin to the maximum allowable limits using definite representation of each fuel design parameters and material properties.

This additional alternative embodiment of the reduced order model of may further comprise the algorithms presented in the computer code and inputted into a computer are $$\frac{1}{E} \frac{d\sigma}{dt} + f(\sigma) = a_0 P + a_1 \frac{dP}{dt}, \quad (3)$$

and $$\frac{d\delta}{dt} = f(\sigma) - a_0 P - a_1 \frac{dP}{dt}, \quad (4)$$

where, t is time, $\delta$ is the pellet-clad gap size relative to clad inner radius, $\sigma$ is clad hoop stress, E is clad material Young's modulus, the function $f$ is the clad inelastic strain rate as function of hoop stress while being irradiated with a given fast neutron flux level and having accumulated a fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power and, where the initial gap size, $\delta_0$, is a manufacturing parameter, the coefficients $a_0$ and $a_1$ are not necessarily constant, and the creep rate function, $f$, is not solely dependent on stress but also on the creep itself and the fast neutron fluence.

As additional consideration for such an alternative embodiment we see that the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1], \quad (5)$$

where B is the burnup in MWd/kgU, P is the linear power in kW/m, $p_u$ is the fraction of unstable pores in the ceramic pellet material, and $p_s$ is the fraction of stable pores in the same material and where the coefficient, $a_1$ is determined by $$a_1 = [1.3 \times 10^{-5} + 5.7 \times 10^{-5} P + 1.6 B] e^{P/50} + 3 \times 10^{-5} \quad (6)$$

and is generally dependent on burnup and linear power level. Additionally, the stress relaxation in the clad is directly linked to the inelastic strain rate given by the function $$f(\sigma) = c_T \sin h(s\sigma) + c_{IRR} \sigma^v \Phi^w \quad (7)$$

and is generally dependent on stress, $\sigma$, and fast flux, $\Phi$, with the coefficient set $c_T$, s, $c_{IRR}$, v, w being specific to clad material and heat treatment.

This alternative embodiment may further receive core instrumentation measurements and monitoring software from a Boiling Water Reactor or from a Pressurized Water Reactor.

Another alternative embodiment of the invention is described as a core monitoring system where XEDOR algorithms are encoded in a computer program for the purpose of calculating stress in fuel rod segments prior to performing reactor power maneuvers comprising the steps of inputting a computer program encoding XEDOR algorithms into a computer, of measuring, via core instrumentation, core operational data required for core monitoring software to generate detailed operational parameters for each fuel rod in the core at a plurality of axial locations or segments in the form of computer data arrays; the XEDOR algorithms accepting as input the data arrays representing the fuel rod segment data and of receiving calculations, from the XEDOR manipulation of the input data, and outputting the calculations to a display for operator consideration in power maneuvering.

Yet another alternative embodiment of the invention is expressed as a computer having a computer program comprising a computer-readable storage medium having computer program logic stored thereon for enabling a processor to execute a XEDOR algorithm, upon receipt of operational data from a reactor core monitoring system, calculate margin to PCI failure, said calculations displayed for reactor operator use for executing a safe power maneuver.

An additional alternative embodiment is noted as a computer with the XEDOR computer program, performing the steps of: receiving operational data from a reactor core monitoring system; calculating stress level in cladding of at least one fuel rod and the associated linear power margin to the maximum allowable limits, using definite representation of each fuel type design parameters and material properties; displaying said calculations for operator use to execute a safe PCI failure free power maneuver such that the said limits are not exceeded.

Yet another alternative embodiment is noted as the method of power maneuvering using XEDOR as coupled to a core monitoring system comprising using the data provided online by a nuclear plant monitoring and instrumentation system; calculating the stress distribution in many or all fuel rods in the reactor core at several axial locations, calculating a margin parameter, for each fuel rod segment representing an axial location, to identify the margin to reaching an operator provided stress limit where such parameter can be the linear power required to reach the stress limit, or the linear power increase above the existing level at the time required to reach the stress limit, or the ratio between the maximum linear power associated with the stress limit and the existing linear power at the time, or other parameters which provide the operator with information regarding the operation margin to reaching the stress limit, projecting, in a predictive manner, the time evolution of the linear power at each rod segment in the core designated for such calculation conditional on stress remaining at or below an operator provided value, performing one or more of the above functions online while directly connected to the reactor instrumentation and monitoring software and displaying the margin parameters to reaching an operator provided stress limit for operator consideration in power maneuvering.

This alternative embodiment may further comprise performing a stress survey and related functions offline using stored data obtained from reactor instrumentation and monitoring systems, performing the stress survey and related functions for the purpose of identifying a failed fuel assembly and further identifying the location of a failed fuel rod in the fuel assembly, performing the stress survey and related functions using design data for the purpose of optimizing the loading pattern of different fuel assemblies in a reactor core, and the associated planned control rod sequences for boiling water reactors, and reactivity management with soluble boron and control rod motion for pressurized water reactors, and displaying the results of the stress survey for designers consideration and benefit to identify and distinguish design patterns with respect to their respective propensity to PCI related fuel rod failures.

Another alternative embodiment is seen as a method for power maneuvering guidance of nuclear reactors comprising calculating a fuel conditioning state, $\Pi$, as function of time, t, by $$a_1 \frac{d\Pi}{dt} + a_0 \Pi = f(\sigma), \quad (10)$$

where the function $f$ is the clad inelastic strain rate driven by the time-dependent hoop stress, $\sigma$, while being irradiated with a given fast neutron flux level and having accumulated a fast neutron fluence, specific for a given clad material and heat treatment, $a_0$ is pellet strain rate per unit linear power, and $a_1$ is pellet strain per unit linear power and, allowing the linear power at a fuel rod segment, P, to vary during a reactor power maneuver with the constraints that it does not exceed the corresponding conditioning state plus a prescribed margin, $\Delta P$, such that $$P \leq \Pi + \Delta P, \quad (9)$$

This alternative embodiment may further comprise obtaining the stress driving the conditioning state calculation from the solution of the XEDOR system equations.

This alternative embodiment may further comprise entering the algorithms for calculating the conditioning state in a computer program connected to the reactor instrumentation and monitoring software and displaying the linear power margin, Π+ΔP−P, calculated by the program for guiding power maneuvering of a boiling water reactor.

Additionally, this alternative embodiment may comprise displaying the core thermal power required for at least one fuel rod segment reaching the maximum linear power, $P_{max}=\Pi+\Delta P$, for guiding the power maneuvering of a pressurized water reactor.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A method for prediction of a plurality of variables characterizing fuel performance, utilizing a reduced order model computer program, applied to nuclear reactor operations, and comprising:
   a. loading a computer program into a computer; inputting, into the computer, reactor core instrumentation measurements; using said measurements to provide input to core monitoring software; accessing the monitoring software generated operational data of linear heat generation rate, neutron flux, burnup, fast neutron fluence, for all or the majority of fuel rods at several axial locations;
   calculating a gap size evolution from its initial as-manufactured value by $$\frac{d\delta}{dt} = f(\sigma) - a_0 P - a_1 \frac{dP}{dt} \quad (4)$$

and,
   b. calculating an evolution of clad hoop stress with time upon gap size reaching zero by $$\frac{1}{E}\frac{d\sigma}{dt} + f(\sigma) = a_0 P + a_1 \frac{dP}{dt} \quad (3)$$

where t is time, δ is pellet-clad gap size relative to clad inner radius, σ is clad hoop stress, E is clad material Young's modulus, the function $f$ is clad inelastic strain rate as function of hoop stress while being irradiated with a given fast neutron flux level and having accumulated a fast neutron fluence, specific for a given clad material and heat treatment, P is linear heat generation rate in pellets of a fuel rod as provided by reactor instrumentation and monitoring software, $a_0$ is pellet strain rate per unit linear power, and $a_1$ is pellet strain per unit linear power
   and,
   c. the parameter $a_0$ is determined by $$a_0 = 2.6\times10^{-8} - 10^{-5}p_u e^{-B/2.3} - 10^{-6}p_s e^{-B/25} + 6\times10^{-9}[\exp(P/50)-1] \quad (5)$$

where B is the burnup in MWd/kgU, P is linear power in kW/m, $p_u$ is fraction of unstable pores in the ceramic pellet material, and $p_s$ is a fraction of stable pores in the same material;
   d. the parameter $a_1$ being generally dependent on burnup and linear power level is determined by $$a_1 = [1.3\times10^{-5} + 5.7\times10^{-5}P + 1.6B]e^{P/50} + 3\times10^{-5} \quad (6)$$

e. a clad creep rate function $f(\sigma)$, being generally dependent on stress and fast neutron flux, Φ, is determined by $$f(\sigma) = c_T \sin h(s\sigma) + c_{IRR}\sigma^v \Phi^w \quad (7)$$

where a coefficient set $c_T$, s, $c_{IRR}$, v, w is specific to clad material and heat treatment;
   f. displaying the calculated parameters, σ and/or δ, and
   g. said displayed calculated parameters prompting nuclear reactor operators in taking operational steps for nuclear reactor operations.

2. The method of claim 1 further comprising:
   a. nuclear reactor operations comprising power maneuvering of a nuclear reactor or designing a core loading pattern of a nuclear reactor or diagnosing of a suspected PCI cladding failure in a nuclear reactor.

3. The method of claim 2, further comprising:
   a. the parameters $a_0$ and $a_1$ and function $f(\sigma)$ are in tabulated form or fitted by curve fitting to a combination of experimental measurements of pellet and clad material properties and a result of large scale fuel performance codes.

4. The method of claim 3, when used for power maneuvering of a nuclear reactor, further comprising:
   a. tracking a maximum allowable linear power compared with a operating linear power in order to ensure that a safety margin to PCI fuel failure exists; projecting a safe power trajectory in order to plan maneuvers such as start up and control rod sequence exchange;
   b. dividing the projected safe power trajectory into a safe power jump followed by a continuous safe power ramp;
   c. predicting a safe power jump by determining the gap and hoop stress when a safe power trajectory projection is requested; calculating the safe power jump as the power corresponding to thermal expansion that consumes the present gap plus clad elastic strain corresponding to a given safe stress setpoint;
   d. predicting an instantaneous power ramp rate where the stress increase due to pellet thermal expansion is balanced by the stress relief due to creep in the cladding material, the power ramp rate being limited to $$R = (f(\sigma^*) - a_0 P)/a_1 \quad (12)$$

e. predicting a continuous power ramp by limiting the power increase rate such that the stress increase due to pellet thermal expansion is balanced by the stress relief due to creep in the cladding material, wherewith the linear power is calculated from $$a_1 \frac{dP}{dt} + a_0 P = f(\sigma^*) \quad (11)$$

which is integrated numerically by the reduced order model computer program whenever a safe power projection over a period of time is requested by the reactor operator;
   f. displaying the predicted safe power jump and power ramp for power maneuvering for nuclear reactor operators and;
   g. said predicted safe power jump and power ramp for prompting nuclear reactor operators in nuclear reactor operations.

5. The method of claim 3 further comprising:
   a. said calculated parameters are for use in core loading pattern design, power maneuvering of a nuclear reactor, or diagnostics of suspected PCI cladding failure in either a Boiling Water Reactor or a Pressurized Water Reactor;

b. displaying the calculated parameters, σ and δ, for prompting of nuclear reactor operators in power maneuvering of a nuclear reactor.

6. The method of claim 3 using reduced order models for fast calculation of cladding stress in the majority of the fuel rods at different elevations of a reactor core for the purpose of calculating margin to and protecting against PCI failures comprising:
   a. inputting, into the computer, core instrumentation measurements, using said measurements to provide input to core monitoring software, accessing the monitoring software generated operational data of linear heat generation rate, neutron flux, burnup, fast neutron fluence, for all or the majority of the fuel rods at several axial locations;
   b. calculating, by the computer program, the gap size and clad stress when the gap is closed;
   c. outputting, to a display, the stress response to a planned power increase, and; said output display prompting core loading pattern design, operator power maneuvering or diagnostics of suspected PCI cladding failure for nuclear reactor operation.

7. The method of claim 6 further comprising:
   a. calculating the linear heat generation rate maximum allowable limit based on the calculated stress and outputting same for operational guidance;
   b. calculating the margin to reaching the maximum allowable linear heat generation rate and outputting same for operational guidance;
   c. calculating the margin in terms of total reactor thermal power to any rod segment reaching the maximum allowable linear heat generation rate and outputting same for design, diagnostics or operational guidance.

8. The method of claim 7 further comprising:
   a. the core instrumentation measurements and monitoring software are from a Boiling Water Reactor or from a Pressurized Water Reactor.

9. A method for prediction of variables in fuel performance, as used in a nuclear reactor utilizing a reduced order model computer program for nuclear reactor operations consisting essentially of:
   a. inputting into a computer a reduced order computer code wherein algorithmic representations, in a computer code, receive data from core instrumentation and monitoring software programs thereby permitting online application for predictive calculations which are performed and yielding calculations for use in nuclear reactor operations; and;
   said reduced order computer code consisting essentially of;
   calculating a gap size evolution from its initial as-manufactured value by $$\frac{d\delta}{dt} = f(\sigma) - a_0 P - a_1 \frac{dP}{dt} \quad (4)$$

and
   b. calculating an evolution of clad hoop stress with time upon gap size reaching zero by $$\frac{1}{E}\frac{d\sigma}{dt} + f(\sigma) = a_0 P + a_1 \frac{dP}{dt} \quad (3)$$

where t is time, δ is pellet-clad gap size relative to clad inner radius, σ is clad hoop stress, E is clad material Young's modulus, the function $f$ is clad inelastic strain rate as function of hoop stress while being irradiated with a given fast neutron flux level and having accumulated a fast neutron fluence, specific for a given clad material and heat treatment, P is linear heat generation rate in pellets of a fuel rod as provided by reactor instrumentation and monitoring software, $a_0$ is pellet strain rate per unit linear power, and $a_1$ is pellet strain per unit linear power
   and,
   c. the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1] \quad (5)$$

where B is the burnup in MWd/kgU, P is linear power in kW/m, $p_u$ is fraction of unstable pores in the ceramic pellet material, and $p_s$ is a fraction of stable pores in the same material;
   d. the parameter $a_1$ being generally dependent on burnup and linear power level is determined by $$a_1 = [1.3 \times 10^{-5} + 5.7 \times 10^{-5} P + 1.6 B] e^{P/50} + 3 \times 10^{-5} \quad (6)$$

e. a clad creep rate function $f(\sigma)$, being generally dependent on stress and fast neutron flux, Φ, is determined by $$f(\sigma) = c_T \sin h(s\sigma) + c_{IRR} \sigma^v \Phi^w \quad (7)$$

where a coefficient set $c_T$, s, $c_{IRR}$, v, w is specific to clad material and heat treatment;
   c. displaying said calculations, σ and/or δ, in physical operator displays for operator consideration where calculations are physically based for nuclear reactor operations safety relative to empirical maneuvering guides;
   d. demonstrating, via the operator display, calculations which are predictive of the stress level and the associated linear heat generation rate margin to the maximum allowable limits, prompting, by knowing the definite representation of each fuel design parameters and material properties, nuclear reactor operators in the operation of nuclear reactors.

10. The method of claim 9 further comprising:
   a. the algorithms presented in the computer code and inputted into a computer are $$\frac{1}{E}\frac{d\sigma}{dt} + f(\sigma) = a_0 P + a_1 \frac{dP}{dt} \quad (3)$$

and $$\frac{d\delta}{dt} = f(\sigma) - a_0 P - a_1 \frac{dP}{dt} \quad (4)$$

where,
   t is time, δ is the pellet-clad gap size relative to clad inner radius, σ is clad hoop stress, E is clad material Young's modulus, the function $f$ is the clad inelastic strain rate as function of hoop stress while being irradiated with a given fast neutron flux level and having accumulated a fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power and,
   where the initial gap size, $\delta_0$, is a manufacturing parameter, the coefficients $a_0$ and $a_1$ are not necessarily constant, and the creep rate function, $f$, is not solely dependent on stress but also on the creep itself and the fast neutron fluence, and, b. nuclear reactor operations comprising power maneuvering of a nuclear reactor or designing a core loading pattern of a nuclear reactor or diagnosing of a suspected PCI cladding failure in a nuclear reactor.

11. The method of claim 10 further comprising:
a. the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1] \quad (5)$$

where B is the burnup in MWd/kgU, P is the linear power in kW/m, $p_u$ is the fraction of unstable pores in the ceramic pellet material, and $p_s$ is the fraction of stable pores in the same material;
b. the coefficient, $a_1$ is determined by $$a_1 = [1.3 \times 10^{-5} + 5.7 \times 10^{-5} P + 1.6B] e^{P/50} + 3 \times 10^{-5} \quad (6)$$

and is generally dependent on burnup and linear power level;
c. and the stress relaxation in the clad is directly linked to the inelastic strain rate given by the function $$f(\sigma) = c_T \sin h(s\sigma) + c_{IRR} \sigma^v \Phi^w \quad (7)$$

and is generally dependent on stress, $\sigma$, and neutron flux, $\Phi$, with the coefficient set $c_T$, s, $c_{IRR}$, v, w being specific to clad material and heat treatment.

12. The method of claim 11 further comprising:
a. the core instrumentation measurements and monitoring software are from a Boiling Water Reactor or from a Pressurized Water Reactor.

13. A method for prediction of variables in fuel performance, as used in a nuclear reactor, utilizing a core monitoring system where algorithms are encoded in a computer program for the purpose of calculating stress in fuel rod segments prior to performing nuclear reactor operations comprising:
a. inputting a computer program encoding the computer program algorithms into a computer;
b. measuring, via core instrumentation, core operational data required for core monitoring software to generate detailed operational parameters for each fuel rod in the core at a plurality of axial locations or segments in the form of computer data arrays; the computer program algorithms accepting as input the data arrays representing the fuel rod segment data; and; the computer program consisting essentially of:
c. inputting into a computer a reduced order computer code wherein algorithmic representations, in a computer code, receive data from core instrumentation and monitoring software programs thereby permitting online application for predictive calculations which are performed and yielding calculations for use in nuclear reactor operations; and;
said reduced order computer code consisting essentially of;
calculating a gap size evolution from its initial as-manufactured value by $$\frac{d\delta}{dt} = f(\sigma) - a_0 P - a_1 \frac{dP}{dt}, \quad (4)$$

and,
d. calculating an evolution of clad hoop stress with time upon gap size reaching zero by $$\frac{1}{E} \frac{d\sigma}{dt} + f(\sigma) = a_0 P + a_1 \frac{dP}{dt} \quad (3)$$

where t is time, $\delta$ is pellet-clad gap size relative to clad inner radius, $\sigma$ is clad hoop stress, E is clad material Young's modulus, the function $f$ is clad inelastic strain rate as function of hoop stress while being irradiated with a given fast neutron flux level and having accumulated a fast neutron fluence, specific for a given clad material and heat treatment, P is linear heat generation rate in pellets of a fuel rod as provided by reactor instrumentation and monitoring software, $a_0$ is pellet strain rate per unit linear power, and $a_1$ is pellet strain per unit linear power
and
e. the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1] \quad (5)$$

where B is the burnup in MWd/kgU, P is linear power in kW/m, $p_u$ is fraction of unstable pores in the ceramic pellet material, and $p_s$ is a fraction of stable pores in the same material;
f. the parameter $a_1$ being generally dependent on burnup and linear power level is determined by $$a_1 = [1.3 \times 10^{-5} + 5.7 \times 10^{-5} P + 1.6B] e^{P/50} + 3 \times 10^{-5} \quad (6)$$

g. a clad creep rate function $f(\sigma)$, being generally dependent on stress and fast neutron flux, $\Phi$, is determined by $$f(\sigma) = c_T \sin h(s\sigma) + c_{IRR} \sigma^v \Phi^w \quad (7)$$

where a coefficient set $c_T$, s, $c_{IRR}$, v, w is specific to clad material and heat treatment;
h. receiving calculations, from the computer program algorithms manipulation of the input data, and outputting the calculations for nuclear reactor operator operations of a nuclear reactor.

14. A method for prediction of, protection against, reduction in the likelihood of and the diagnostics of pellet-clad interaction failure of nuclear fuel rods utilizing a core monitoring system where computer program algorithms are encoded in a computer program and are loaded in a computer having a computer-readable storage medium having computer program logic stored thereon for enabling a processor to execute the computer program algorithms, upon receipt of operational data from a reactor core monitoring system, calculate margin to PCI failure, said calculations used for reactor operations for executing a safe power maneuver; computer program algorithms comprising inputting into a computer a computer program implementing the algorithms for calculating the gap size evolution from its initial as-manufactured value by $$\frac{d\delta}{dt} = f(\sigma) - a_0 P - a_1 \frac{dP}{dt}, \quad (4)$$

and,
calculating the evolution of clad hoop stress with time upon gap size reaching zero by $$\frac{1}{E} \frac{d\sigma}{dt} + f(\sigma) = a_0 P + a_1 \frac{dP}{dt}, \quad (3)$$

where t is time, $\delta$ is the pellet-clad size relative to clad inner radius, $\sigma$ is clad hoop stress, E is clad material Young's modulus, the function $f$ is the clad inelastic strain rate as function of hoop stress for given fast neutron flux level and cumulative fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power and;

where the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1] \quad (5)$$

where B is the burnup in MWd/kgU, P is the linear power in kW/m, $p_u$ is the fraction of unstable pores in the ceramic pellet material, and $p_s$ is the fraction of stable pores in the same material and, where the parameter $a_1$ being generally dependent on burnup and linear power level is determined by $$a_1 = [1.3 \times 10^{-5} + 5.7 \times 10^{-5} P + 1.6B] e^{P/50} + 3 \times 10^{-5} \quad (6)$$

and:

additionally, inputting, into the computer, core instrumentation measurements, using said measurements to provide input to core monitoring software, accessing the monitoring software generated operational data of linear heat generation rate, neutron flux, burnup, fast neutron fluence, for all or the majority of the fuel rods at several axial locations and calculating, by the computer program, the gap size and clad stress when the gap is closed; thereafter, outputting, to an operators display, the stress response to a planned power increase, as operational guidance for power maneuvering.

15. A method for prediction of, protection against, prevention of and the diagnostics of pellet-clad interaction failure of nuclear fuel rods utilizing a core monitoring system where computer program algorithms are encoded in a computer program and are loaded in a computer performing the steps of: receiving operational data from a reactor core monitoring system; calculating stress level in cladding of a plurality of fuel rods and the associated linear power margin to the maximum allowable limits assigned to PCI failure mode, using definite representation of each fuel type design parameters and material properties and;

where said computer program algorithms consist essentially of:

inputting into a computer a reduced order computer code wherein algorithmic representations, in a computer code, receive data from core instrumentation and monitoring software programs thereby permitting online application for predictive calculations which are performed and yielding calculations for use in nuclear reactor operations; and;

said reduced order computer code consisting essentially of;

calculating a gap size evolution from its initial as-manufactured value by $$\frac{d\delta}{dt} = f(\sigma) - a_0 P - a_1 \frac{dP}{dt} \quad (4)$$

and calculating an evolution of clad hoop stress with time upon gap size reaching zero by $$\frac{1}{E}\frac{d\sigma}{dt} + f(\sigma) = a_0 P + a_1 \frac{dP}{dt} \quad (3)$$

where t is time, $\delta$ is pellet-clad gap size relative to clad inner radius, $\sigma$ is clad hoop stress, E is clad material Young's modulus, the function $f$ is clad inelastic strain rate as function of hoop stress while being irradiated with a given fast neutron flux level and having accumulated a fast neutron fluence, specific for a given clad material and heat treatment, P is linear heat generation rate in pellets of a fuel rod as provided by reactor instrumentation and monitoring software, $a_0$ is pellet strain rate per unit linear power, and $a_1$ is pellet strain per unit linear power and, the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1] \quad (5)$$

where B is the burnup in MWd/kgU, P is linear power in kW/m, $p_u$ is fraction of unstable pores in the ceramic pellet material, and $p_s$ is a fraction of stable pores in the same material;

the parameter $a_1$ being generally dependent on burnup and linear power level is determined by $$a_1 = [1.3 \times 10^{-5} + 5.7 \times 10^{-5} P + 1.6B] e^{P/50} + 3 \times 10^{-5} \quad (6)$$

a clad creep rate function $f(\sigma)$, being generally dependent on stress and fast neutron flux, $\Phi$, is determined by $$f(\sigma) = c_T \sin h(s\sigma) + c_{IRR} \sigma^v \Phi^w \quad (7)$$

where a coefficient set $c_T$, s, $c_{IRR}$, v, w is specific to clad material and heat treatment;

displaying said calculations to nuclear reactor operators to execute a safe PCI failure free power maneuver such that the said limits are not exceeded.

16. A method for prediction of, protection against, reduction in the likelihood of and the diagnostics of pellet-clad interaction failure of nuclear fuel rods, during power maneuvering, using a computer program as coupled to a core monitoring system comprising:

a. using data provided online by a nuclear plant monitoring and instrumentation system; calculating the stress distribution in many or all fuel rods in the reactor core at several axial locations;

b. calculating a margin parameter, for each fuel rod segment representing an axial location, to identify the margin to reaching an operator provided stress limit where such parameter can be the linear power required to reach the stress limit, or the linear power increase above the existing level at the time required to reach the stress limit, or the ratio between the maximum linear power associated with the stress limit and the existing linear power at the time, or other parameters which provide the operator with information regarding the operation margin to reaching the stress limit; and;

where said computer program algorithms consist essentially of:

inputting into a computer a reduced order computer code wherein algorithmic representations, in a computer code, receive data from core instrumentation and monitoring software programs thereby permitting online application for predictive calculations which are performed and yielding calculations for use in nuclear reactor operations; and;

said reduced order computer code consisting essentially of;

calculating a gap size evolution from its initial as-manufactured value by $$\frac{d\delta}{dt} = f(\sigma) - a_0 P - a_1 \frac{dP}{dt} \quad (4)$$

and, calculating an evolution of clad hoop stress with time upon gap size reaching zero by $$\frac{1}{E}\frac{d\sigma}{dt} + f(\sigma) = a_0 P + a_1 \frac{dP}{dt} \quad (3)$$

where t is time, $\delta$ is pellet-clad gap size relative to clad inner radius, $\sigma$ is clad hoop stress, E is clad material Young's modulus, the function $f$ is clad inelastic strain rate as function of hoop stress while being irradiated with a given fast neutron flux level and having accumulated a fast neutron fluence, specific for a given clad material and heat treatment, P is linear heat generation rate in pellets of a fuel rod as provided by reactor instrumentation and monitoring software, $a_0$ is pellet strain rate per unit linear power, and $a_1$ is pellet strain per unit linear power and the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1] \quad (5)$$

where B is the burnup in MWd/kgU, P is linear power in kW/m, $p_u$ is fraction of unstable pores in the ceramic pellet material, and $p_s$ is a fraction of stable pores in the same material;

the parameter $a_1$ being generally dependent on burnup and linear power level is determined by $$a_1 = [1.3 \times 10^{-5} + 5.7 \times 10^{-5} P + 1.6 B] e^{P/50} + 3 \times 10^{-5} \quad (6)$$

a clad creep rate function $f(\sigma)$, being generally dependent on stress and fast neutron flux, $\Phi$, is determined by $$f(\sigma) = c_T \sin h(s\sigma) + c_{IRR} \sigma^v \Phi^w \quad (7)$$

where a coefficient set $c_T$, s, $c_{IRR}$, v, w is specific to clad material and heat treatment;

c. projecting, in a predictive manner, the time evolution of the linear power at each rod segment in the core designated for such calculation conditional on stress remaining at or below an operator provided value;
d. performing the above functions online while directly connected to the reactor instrumentation and monitoring software;
e. displaying the margin parameters to reaching an operator provided stress limit for nuclear reactor operators in operations of a nuclear reactor in power maneuvering.

17. The method of claim 16 further comprising:
a. performing a stress survey and related functions offline using stored data obtained from reactor instrumentation and monitoring systems;
b. performing the stress survey and related functions for the purpose of identifying a failed fuel assembly and further identifying the location of a failed fuel rod in the fuel assembly;
c. performing the stress survey and related functions using design data for the purpose of optimizing the loading pattern of different fuel assemblies in a reactor core, and the associated planned control rod sequences for boiling water reactors, and reactivity management with soluble boron and control rod motion for pressurized water reactors;
d. displaying the results of the stress survey for designers consideration and benefit to identify and distinguish design patterns with respect to their respective propensity to PCI related fuel rod failures.

18. A method for prediction of, protection against, reduce the likelihood of and provide diagnostics of pellet-clad interaction failure of nuclear fuel rods during power maneuvering guidance of nuclear reactors using a computer program comprising:

a. computer program algorithms comprising inputting into a computer a computer program implementing the algorithms for calculating the gap size evolution from its initial as-manufactured value by $$\frac{d\delta}{dt} = f(\sigma) - a_0 P - a_1 \frac{dP}{dt}, \quad (4)$$

and, calculating the evolution of clad hoop stress with time upon gap size reaching zero by $$\frac{1}{E}\frac{d\sigma}{dt} + f(\sigma) = a_0 P + a_1 \frac{dP}{dt}, \quad (3)$$

where t is time, $\delta$ is the pellet-clad size relative to clad inner radius, $\sigma$ is clad hoop stress, E is clad material Young's modulus, the function $f$ is the clad inelastic strain rate as function of hoop stress for given fast neutron flux level and cumulative fast neutron fluence, specific for a given clad material and heat treatment, P is the linear heat generation rate in pellets of the fuel rod as provided by reactor instrumentation and monitoring software, $a_0$ is pellet strain rate per unit linear power, and $a_1$ is pellet strain per unit linear power and, where the parameter $a_0$ is determined by $$a_0 = 2.6 \times 10^{-8} - 10^{-5} p_u e^{-B/2.3} - 10^{-6} p_s e^{-B/25} + 6 \times 10^{-9} [\exp(P/50) - 1] \quad (5)$$

where B is the burnup in MWd/kgU, P is the linear power in kW/m, $p_u$ is the fraction of unstable pores in the ceramic pellet material, and $p_s$ is the fraction of stable pores in the same material and, where the parameter $a_1$ being generally dependent on burnup and linear power level is determined by $$a_1 = [1.3 \times 10^{-5} + 5.7 \times 10^{-5} P + 1.6 B] e^{P/50} + 3 \times 10^{-5} \quad (6) \text{ and:}$$

additionally, inputting, into the computer, core instrumentation measurements, using said measurements to provide input to core monitoring software, accessing the monitoring software generated operational data of linear heat generation rate, neutron flux, burnup, fast neutron fluence, for all or the majority of the fuel rods at several axial locations and calculating, by the computer program, the gap size and clad stress when the gap is closed, and;

b. calculating a fuel conditioning state, $\Pi$, as function of time, t, by $$a_1 \frac{d\Pi}{dt} + a_0 \Pi = f(\sigma) \quad (10)$$

where the function $f$ is the clad inelastic strain rate driven by the time-dependent hoop stress, $\sigma$, while being irradiated with a given fast neutron flux level and having accumulated a fast neutron fluence, specific for a given clad material and heat treatment, and;

c. allowing the linear power at a fuel rod segment, P, to vary during a reactor power maneuver with the constraints that it does not exceed the corresponding conditioning state plus a prescribed margin, $\Delta P$, such that $P \leq \Pi + \Delta P$ (9), and:

thereafter, outputting, to an operators display, the stress response to a planned power increase, as operational guidance for a nuclear reactor operator for power maneuvering.

19. A method of reactor maneuvering of claim 18 further comprising:
   a. obtaining stress driving the conditioning state calculation from a solution of the computer program system equations.

20. A method of reactor maneuvering of claim 19 further comprising:
   a. entering the computer program algorithms for calculating the conditioning state in a computer program connected to the reactor instrumentation and monitoring software;
   b. displaying the linear power margin, $\Pi+\Delta P - P$, calculated by the program for guiding power maneuvering of a boiling water reactor.

21. A method of reactor maneuvering of claim 20 further comprising:
   a. displaying the core thermal power required for a plurality of fuel rod segments reaching the maximum linear power, $P_{max} = \Pi + \Delta P$, for guiding the power maneuvering of a pressurized water reactor.

* * * * *